US012793276B2

(12) United States Patent
Ramasubramonian et al.

(10) Patent No.: US 12,793,276 B2
(45) Date of Patent: Nov. 10, 2026

(54) INTER PREDICTION CODING FOR GEOMETRY POINT CLOUD COMPRESSION

(71) Applicant: QUALCOMM Incorporated, San Diego, CA (US)

(72) Inventors: Adarsh Krishnan Ramasubramonian, Irvine, CA (US); Geert Van der Auwera, San Diego, CA (US); Luong Pham Van, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 564 days.

(21) Appl. No.: 17/934,860

(22) Filed: Sep. 23, 2022

(65) Prior Publication Data

US 2023/0102401 A1 Mar. 30, 2023

Related U.S. Application Data

(60) Provisional application No. 63/250,953, filed on Sep. 30, 2021.

(51) Int. Cl.
*G06T 3/40* (2024.01)
*G06T 9/00* (2006.01)
*G06T 9/40* (2006.01)

(52) U.S. Cl.
CPC ................ *G06T 9/001* (2013.01); *G06T 9/40* (2013.01)

(58) Field of Classification Search
CPC ............ G06T 9/001; G06T 9/40; G06T 9/004
See application file for complete search history.

(56) References Cited

U.S. PATENT DOCUMENTS

| | | | | |
|---|---|---|---|---|
| 7,966,347 | B2 * | 6/2011 | McNutt | G06F 11/3428 707/778 |
| 8,676,937 | B2 * | 3/2014 | Rapaport | H04L 67/306 709/219 |
| 8,755,287 | B2 * | 6/2014 | Nakashima | H04L 41/0661 370/254 |
| 9,544,799 | B2 * | 1/2017 | Okita | H04L 43/028 |
| 9,722,920 | B2 * | 8/2017 | Nakashima | H04L 45/48 |
| 10,334,501 | B2 * | 6/2019 | Tohzaka | H04W 40/02 |

(Continued)

OTHER PUBLICATIONS

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

(Continued)

*Primary Examiner* — Philip P. Dang
(74) *Attorney, Agent, or Firm* — QUALCOMM Incorporated; Espartaco Diaz Hidalgo

(57) ABSTRACT

An example method of encoding a point cloud includes, responsive to determining that a first point of the point cloud is a first point in a first group of points of one or more groups of points of the point cloud, encoding, in a bitstream, one or more syntax elements related to inter prediction for the first group of points. The example method may further include, responsive to determining that a second point of the point cloud is included in the first group of points but is not the first point in the first group of points, skip re-encoding, for the second point, the one or more syntax elements related to inter prediction for the first group of points.

17 Claims, 13 Drawing Sheets

(56) References Cited

U.S. PATENT DOCUMENTS

| | | | | |
|---|---|---|---|---|
| 11,030,008 | B2 * | 6/2021 | Jeon | G06F 9/5022 |
| 11,093,252 | B1 * | 8/2021 | Agarwal | G06F 3/065 |
| 11,206,426 | B2 * | 12/2021 | Sugio | H04N 19/597 |
| 11,321,350 | B2 * | 5/2022 | Schrum | G06F 16/23 |
| 11,443,459 | B2 * | 9/2022 | Sugio | G06T 9/40 |
| 11,553,396 | B2 * | 1/2023 | Matsuura | H04L 45/48 |
| 11,889,114 | B2 * | 1/2024 | Iguchi | H04N 19/597 |
| 11,895,341 | B2 * | 2/2024 | Oh | H04N 19/96 |
| 11,910,026 | B2 * | 2/2024 | Yano | H03M 7/3077 |
| 11,928,844 | B2 * | 3/2024 | Iguchi | G06T 9/40 |
| 11,949,869 | B2 * | 4/2024 | Sugio | H04N 19/124 |
| 11,979,607 | B2 * | 5/2024 | Oh | H04N 19/597 |
| 11,990,229 | B2 * | 5/2024 | Gilmore | G06T 11/26 |
| 11,991,348 | B2 * | 5/2024 | Yano | G06T 9/001 |
| 12,003,767 | B2 * | 6/2024 | Sugio | H04N 19/70 |
| 12,010,341 | B2 * | 6/2024 | Oh | G06T 17/005 |
| 12,010,350 | B2 * | 6/2024 | Oh | H04N 19/124 |
| 12,149,579 | B2 * | 11/2024 | Oh | H04L 65/61 |
| 12,159,435 | B2 * | 12/2024 | Oh | H04N 19/597 |
| 12,159,437 | B2 * | 12/2024 | Yang | G06T 9/001 |
| 12,190,549 | B2 * | 1/2025 | Kuma | G06T 17/005 |
| 12,230,004 | B2 * | 2/2025 | Zhang | H04N 19/597 |
| 12,236,646 | B2 * | 2/2025 | Oh | G06T 9/00 |
| 12,236,651 | B2 * | 2/2025 | Taquet | G06T 9/40 |
| 12,244,866 | B2 * | 3/2025 | Oh | H04N 19/96 |
| 12,262,055 | B2 * | 3/2025 | Hur | H04N 19/164 |
| 12,283,076 | B2 * | 4/2025 | Sugimoto | G06T 9/001 |
| 12,299,938 | B2 * | 5/2025 | Park | G06T 9/001 |
| 12,307,723 | B2 * | 5/2025 | Kuma | G06T 9/00 |
| 12,307,726 | B2 * | 5/2025 | Oh | G06T 9/001 |
| 12,307,729 | B2 * | 5/2025 | Oh | G06T 15/00 |
| 12,335,520 | B2 * | 6/2025 | Hur | H04N 19/119 |
| 12,354,310 | B2 * | 7/2025 | Park | G06T 9/40 |
| 12,380,604 | B2 * | 8/2025 | Lee | H04N 19/70 |
| 12,444,089 | B2 * | 10/2025 | Hur | G06T 9/00 |
| 12,464,138 | B2 * | 11/2025 | Oh | G06T 9/001 |
| 12,483,721 | B2 * | 11/2025 | Lee | H04N 19/52 |
| 12,524,916 | B2 * | 1/2026 | Park | G06T 9/001 |
| 12,549,763 | B2 * | 2/2026 | Hur | H04N 19/119 |
| 2003/0133429 | A1 * | 7/2003 | Choi | H04B 7/2684 370/441 |
| 2009/0079876 | A1 * | 3/2009 | Takeshima | G06T 3/4069 348/E5.062 |
| 2017/0169174 | A1 * | 6/2017 | Yeung | G16H 50/70 |
| 2018/0307426 | A1 * | 10/2018 | Sakai | G06F 3/0689 |
| 2019/0156507 | A1 * | 5/2019 | Zeng | G06F 16/23 |
| 2020/0043121 | A1 * | 2/2020 | Boyce | G06T 15/005 |
| 2020/0219286 | A1 * | 7/2020 | Sinharoy | G06T 7/174 |
| 2020/0296423 | A1 * | 9/2020 | Chao | H04N 19/42 |
| 2021/0104013 | A1 * | 4/2021 | Hur | G06T 9/001 |
| 2022/0078436 | A1 * | 3/2022 | Kim | H04N 19/137 |
| 2022/0210471 | A1 * | 6/2022 | Zhang | H04N 19/136 |
| 2022/0245863 | A1 * | 8/2022 | Kuma | G06T 17/005 |
| 2022/0343550 | A1 * | 10/2022 | Yang | G06F 16/22 |
| 2022/0358686 | A1 * | 11/2022 | Lasserre | H04N 19/96 |
| 2023/0281878 | A1 * | 9/2023 | Oh | G06T 9/001 375/240.01 |
| 2023/0291895 | A1 * | 9/2023 | Lee | H04N 19/96 |
| 2023/0316582 | A1 * | 10/2023 | Kuma | G06T 9/001 382/243 |
| 2023/0334719 | A1 * | 10/2023 | Lee | H04N 19/96 |
| 2024/0056604 | A1 * | 2/2024 | Kuma | H04N 19/597 |
| 2024/0078690 | A1 * | 3/2024 | Reaungamornrat | G06T 7/33 |
| 2024/0196012 | A1 * | 6/2024 | Oh | H04N 19/54 |
| 2024/0276013 | A1 * | 8/2024 | Oh | H04N 19/119 |
| 2024/0364924 | A1 * | 10/2024 | Oh | H04N 19/139 |

OTHER PUBLICATIONS

Guarda A.F.R., et al., "Adaptive Deep Learning-Based Point Cloud Geometry Coding", IEEE Journal of Selected Topics in Signal Processing, IEEE, US, vol. 15, No. 2, Dec. 25, 2020, pp. 415-430.

"Information Technology—MPEG-I (Coded Representation of Immersive Media)—Part 9: Geometry-based Point Cloud Compression", ISO/IEC 23090-9:2020(E), ISO/IEC JTC 1/SC 29/WG 11, 2020, 127 pages.

International Search Report and Written Opinion—PCT/US2022/077004—ISA/EPO—Dec. 15, 2022.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Jin J., et al., "An Improved Coarse-To-Fine Motion Estimation Scheme for Lidar Point Cloud Geometry Compression", 2021 IEEE I 3.3nternational Conference On Multimedia & Expo Workshops (ICMEW), IEEE, Jul. 5, 2021, pp. 1-6.

Ramasubramonian(Qualcomm) A.K., et al., "[G-PCC] EE13.2 report on InterPrediction, Test 2", 134. MPEG Meeting, Apr. 26, 2021-Apr. 30, 2021, online, (Motion Picture Expert Group or ISO/IEC JTC1/SC29/WG11), No. m56839, 6 Pages, Apr. 25, 2021.

"Text of ISO/IEC 23090-9 DIS Geometry-Based Point Cloud Compression", 129. MPEG Meeting, Jan. 13, 2020-Jan. 17, 2020, Brussels, (Motion Picture Expert Group or ISO/IEC JTC1/SC29/WG11), No. n19088, Apr. 20, 2020, XP030287968, p. 40.

"Technologies under consideration in G-PCC", 134. MPEG Meeting, Apr. 26, 2021-Apr. 30, 2021, Online, (Motion Picture Expert Group or ISO/IEC JTC1/SC29/WG11), No. n20374, May 29, 2021, XP030294656, 12 pp.

* cited by examiner

| geometry_predtree_node( depth, nodeIdx ) { | **Descriptor** |
| --- | --- |
| if( geom_scaling_enabled_flag && !( nodeIdx % PtnQpInterval ) ) { | |
| **ptn_qp_offset_abs_gt0_flag** | ae(v) |
| if( ptn_qp_offset_abs_gt0_flag ) { | |
| **ptn_qp_offset_abs_minus1** | ae(v) |
| **ptn_qp_offset_sign_flag** | ae(v) |
| } | |
| } | |
| if( duplicate_points_enabled_flag ) { | |
| **ptn_point_cnt_gt1_flag [Ed, dup points?]** | ae(v) |
| if( ptn_point_cnt_gt1_flag ) | |
| **ptn_point_cnt_minus2** | ae(v) |
| } | |
| **ptn_child_cnt**[ nodeIdx ] | ae(v) |
| if(InterEnableFlag && <ADD> (PtnNodeCnt % PtnGroupSize == 0) </ADD>) { | |
| **ptn_inter_flag**[ nodeIdx ] | u(1) |
| if (ptn_inter_flag[ nodeIdx ] ) | |
| **ptn_inter_pred_mode**[ nodeIdx ] | u(1) |
| } | |
| if( !ptn_inter_flag[ nodeidx ] ) | |
| **ptn_pred_mode**[ nodeIdx ] | ae(v) |
| if( geometry_angular_enabled_flag ) { | |
| **ptn_phi_mult_abs_gt0_flag** | ae(v) |
| if( ptn_phi_mult_abs_gt0_flag ) { | |
| **ptn_phi_mult_abs_gt1_flag** | ae(v) |
| if( ptn_phi_mult_abs_gt1_flag ) | |
| **ptn_phi_mult_abs_minus2** | ae(v) |
| if( ptn_phi_mult_abs_minus2 = = 7 ) | |
| **ptn_phi_mult_abs_minus9** | ae(v) |
| **ptn_phi_mult_sign_flag** | ae(v) |
| } | |
| } | |

FIG. 12A

| | |
|---|---|
| numComp = geometry_angular_enabled_flag && !number_lasers_minus1 ? 2 : 3 | |
| for( k = 0; k < numComp; k++ ) { | |
| **ptn_residual_abs_gt0_flag**[ k ] | ae(v) |
| if( ptn_residual_abs_gt0_flag[ k ] ) { | |
| **ptn_residual_abs_log2**[ k ] | ae(v) |
| **ptn_residual_abs_remaining**[ k ] | ae(v) |
| if( k \|\| ptn_pred_mode[ nodeIdx ] \|\| ptn_inter_flag[ nodeIdx ] ) | |
| **ptn_residual_sign_flag**[ k ] | ae(v) |
| } | |
| } | |
| if( geometry_angular_enabled_flag ) | |
| for( k = 0; k < 3; k++ ) { | |
| **ptn_sec_residual_abs_gt0_flag**[ k ] | ae(v) |
| if( ptn_sec_residual_abs_gt0_flag[ k ] ) { | |
| **ptn_sec_residual_abs_gt1_flag**[ k ] | ae(v) |
| if( ptn_sec_residual_abs_gt1_flag[ k ] ) | |
| **ptn_sec_residual_abs_minus2**[ k ] | ae(v) |
| **ptn_sec_residual_sign_flag**[ k ] | ae(v) |
| } | |
| } | |
| <ADD> PtnNodeCnt++ </ADD> | |
| for( i = 0; i < ptn_child_cnt[ nodeIdx ]; i++) | |
| geometry_predtree_node( depth + 1, ++PtnNodeIdx ) | |
| } | |

FIG. 12B

INTER PREDICTION CODING FOR GEOMETRY POINT CLOUD COMPRESSION

This application claims the benefit of U.S. Provisional Application No. 63/250,953, filed Sep. 30, 2021, the entire contents of which are incorporated by reference herein.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for coding nodes of a point cloud, such as for the Geometry Point Cloud Compression (G-PCC) standard currently being developed. However, the example techniques are not limited to the G-PCC standard. In some examples of G-PCC, coordinates of position of nodes (also referred to as points) of a point cloud may be converted into a (r, ϕ, i) domain in which a position of a node is represented by three parameters, a radius r, an azimuth ϕ, and a laser index i. When using an angular mode for predictive geometry coding in G-PCC, a G-PCC coder may perform prediction in the (r, ϕ, i) domain. For instance, the G-PCC coder may individually code a radius r, an azimuth ϕ, and a laser index i for each point in a point cloud. However, such individual coding of points may present one or more disadvantages. For instance, individually coding a radius r, an azimuth ϕ, and a laser index i for each point may require a large amount of bandwidth.

A G-PCC coder may predict a current point of a current frame of a point cloud using inter prediction. For instance, to predict the current point using inter prediction, the G-PCC coder may identify a reference point in a different frame than the current frame and predict one or more parameters (e.g., a radius r, an azimuth ϕ, and a laser index i) of the current point based on one or more parameters of the reference point. Where one or more of the parameters of the reference point are closer to the parameters of the current point than the parent or other available points in the current frame, predicting the current point using inter prediction may reduce the size of residual data. In this way, the techniques of this disclosure may enable a G-PCC coder to improve coding efficiency.

The G-PCC coder may signal an indication of whether a point of a point cloud is predicted using inter prediction. For instance, the G-PCC coder may signal a respective inter mode flag for each respective point of the point cloud that indicates whether the respective point is inter coded. However, separately coding an inter mode flag for each point may present one or more disadvantages, such as high bandwidth usage.

In accordance with one or more aspects of this disclosure, a G-PCC coder may signal syntax elements that apply to groups of points of a point cloud (i.e., more than one point). For instance, as opposed to separately signaling an inter mode flag for each point of a point cloud, the G-PCC coder may signal a single inter mode flag that indicates whether all points in a group of points are coded using inter prediction. As such, the G-PCC coder may avoid having to signal a separate inter mode flag for each point. In this way, aspects of this disclosure may improve efficiency (e.g., reduce bandwidth usage) of point cloud compression.

In one example, a method of encoding a point cloud includes responsive to determining that a first point of the point cloud is a first point in a first group of points of one or more groups of points of the point cloud, encoding, in a bitstream, one or more syntax elements related to inter prediction for the first group of points.

In another example, a method of decoding a point cloud includes responsive to determining that a first point of the point cloud is a first point in a first group of points of one or more groups of points of the point cloud, parsing, from a bitstream, one or more syntax elements related to inter prediction for the first group of points; and predicting, based on the one or more syntax elements, the first point.

In another example, a device for processing a point cloud includes a memory configured to store at least a portion of the point cloud; and one or more processors implemented in circuitry and configured to: determine whether a first point of the point cloud is a first point in a first group of points of one or more groups of points of the point cloud; and responsive to determining that the first point of the point cloud is the first point in the first group of points, encode, in a bitstream, one or more syntax elements related to inter prediction for the first group of points.

In another example, a device for processing a point cloud includes a memory configured to store at least a portion of the point cloud; and one or more processors implemented in circuitry and configured to: determine whether a first point of the point cloud is a first point in a first group of points of one or more groups of points of the point cloud; and responsive to determining that the first point of the point cloud is the first point in the first group of points: parse, from a bitstream, one or more syntax elements related to inter prediction for the first group of points; and predict, based on the one or more syntax elements, the first point.

The details of one or more examples are set forth in the accompanying drawings and the description below. Other features, objects, and advantages will be apparent from the description, drawings, and claims.

BRIEF DESCRIPTION OF DRAWINGS

FIGS. 12A and 12B is a syntax table illustrating an example signaling of syntax elements, in accordance with one or more techniques of this disclosure.

DETAILED DESCRIPTION

Figure 1:
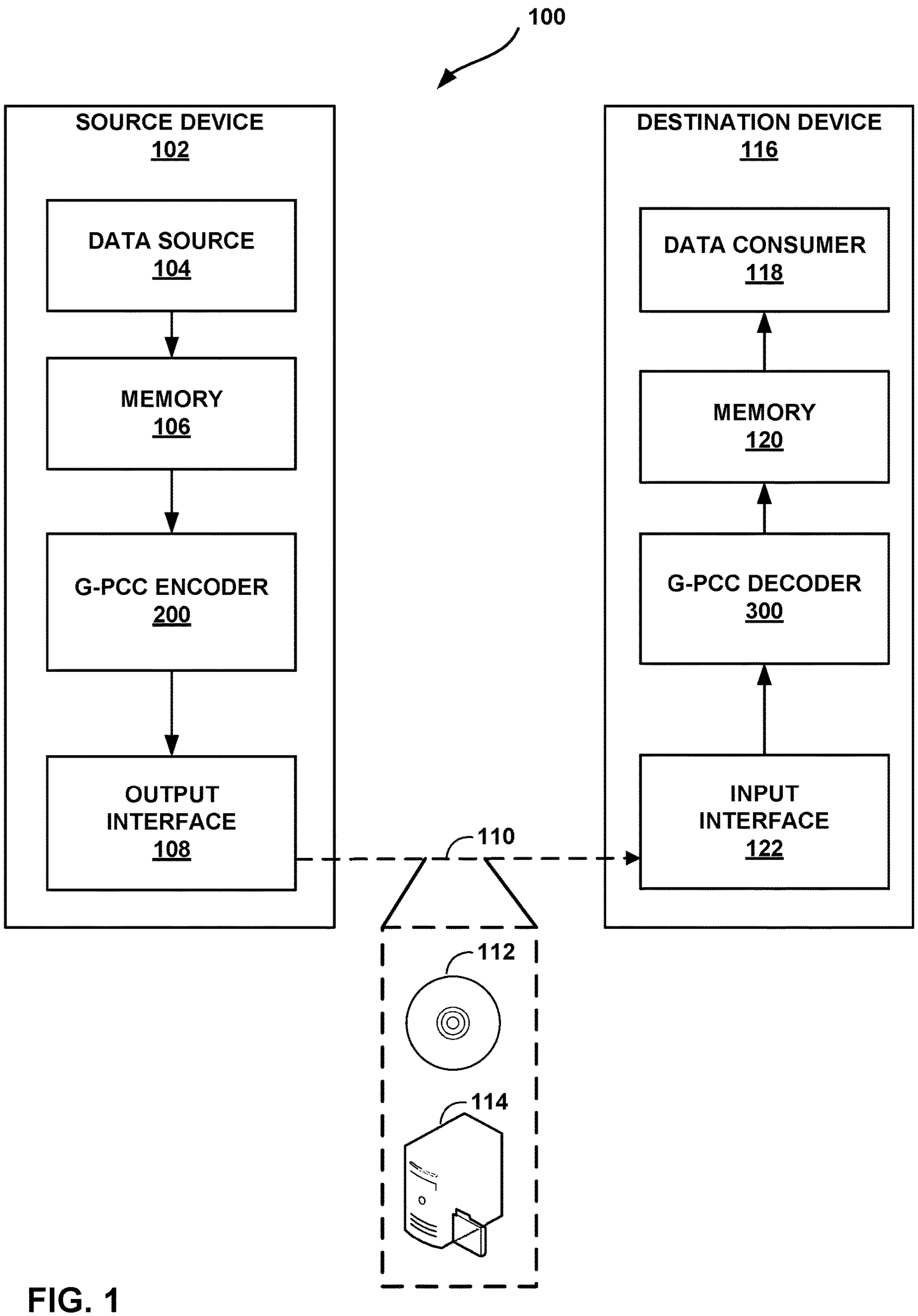
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to inter prediction coding for geometry point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to inter prediction coding for geometry point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC 1/SC 29/WG 11 w19088, Brussels, Belgium, January 2020, and a description of the codec is available in G-PCC Codec Description v6, ISO/IEC JTC 1/SC 29/WG 11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
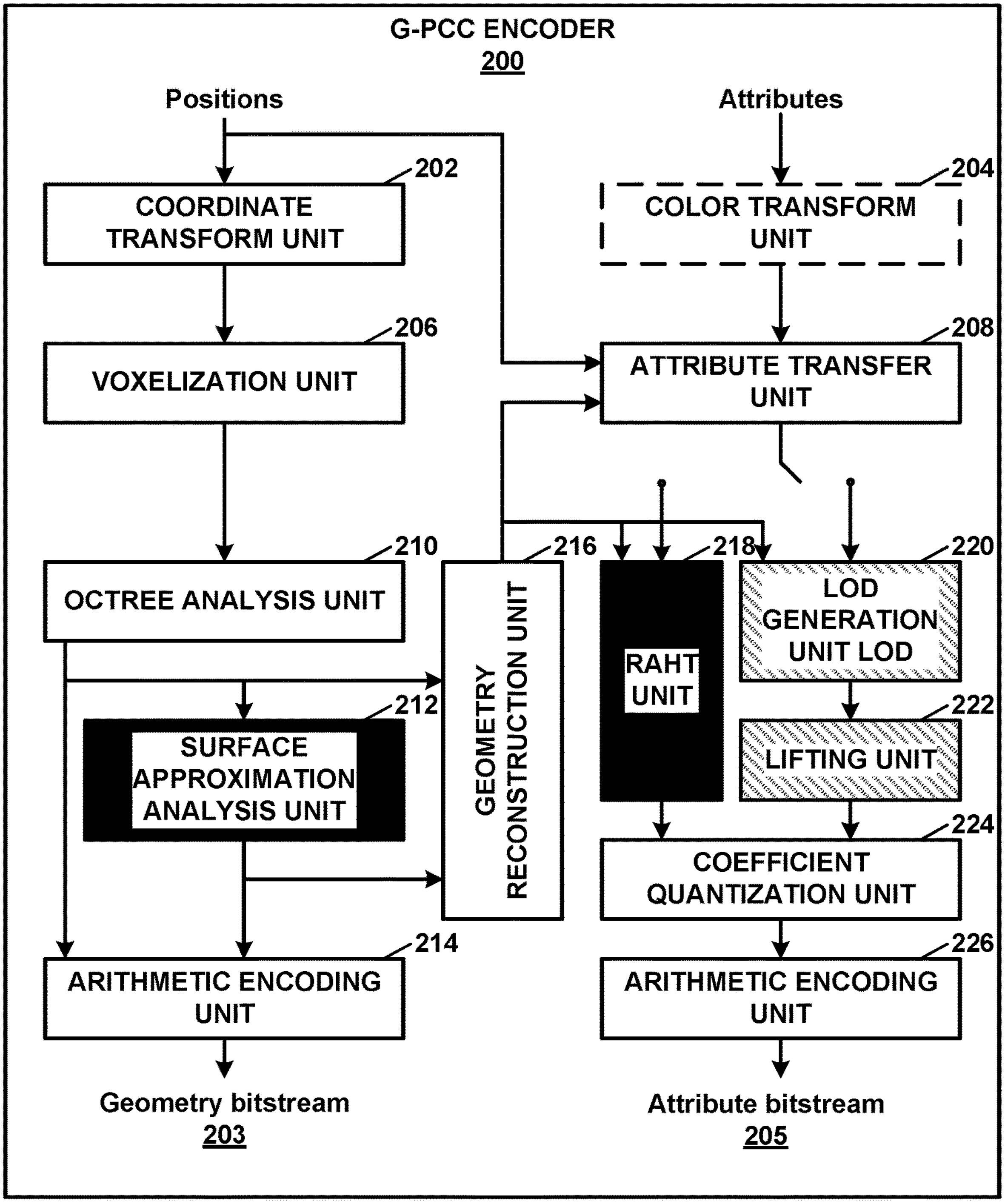
FIG. 2 is a block diagram illustrating an example Geometry Point Cloud Compression (G-PCC) encoder.
Figure 3:
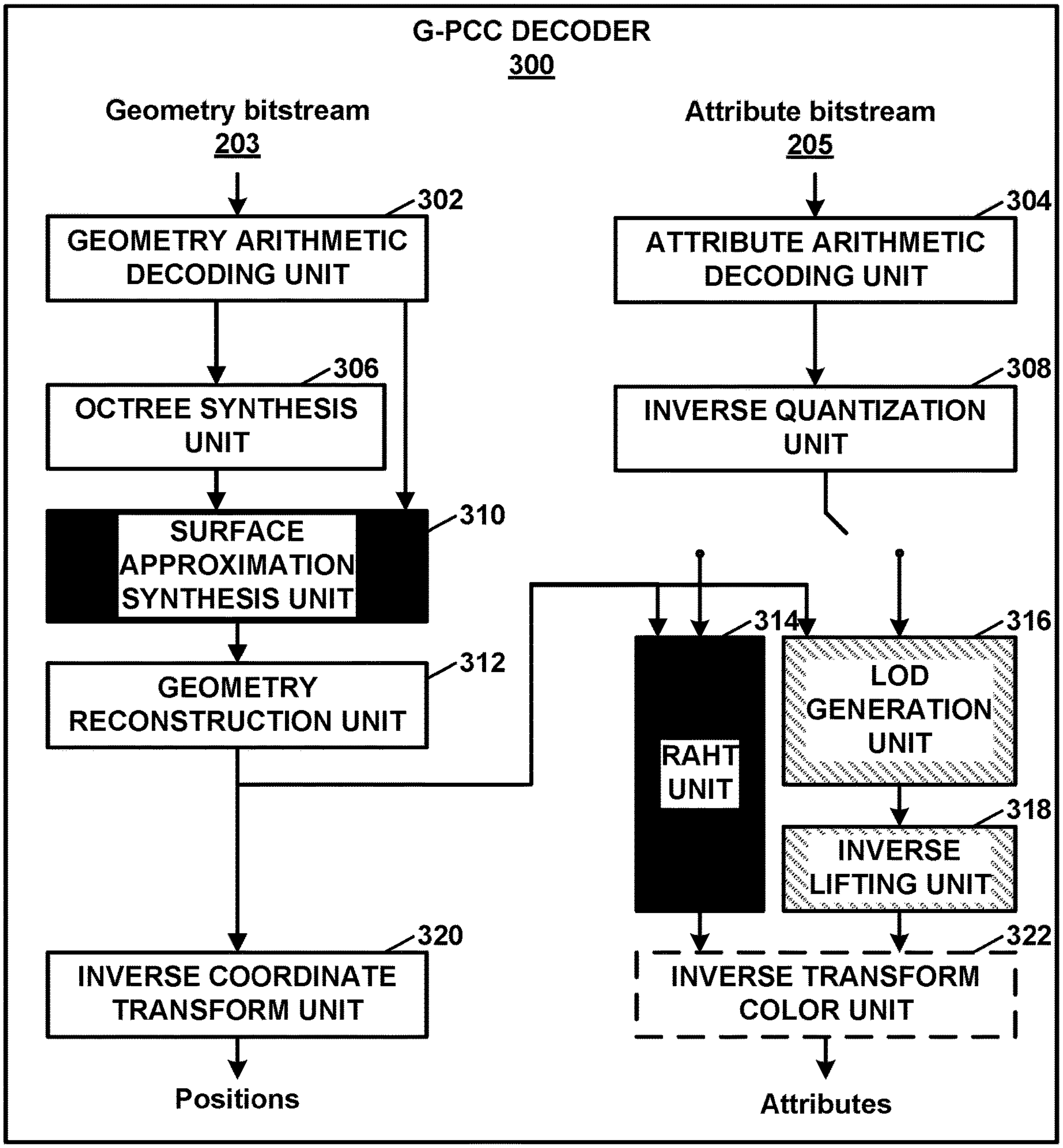
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

Figure 4:
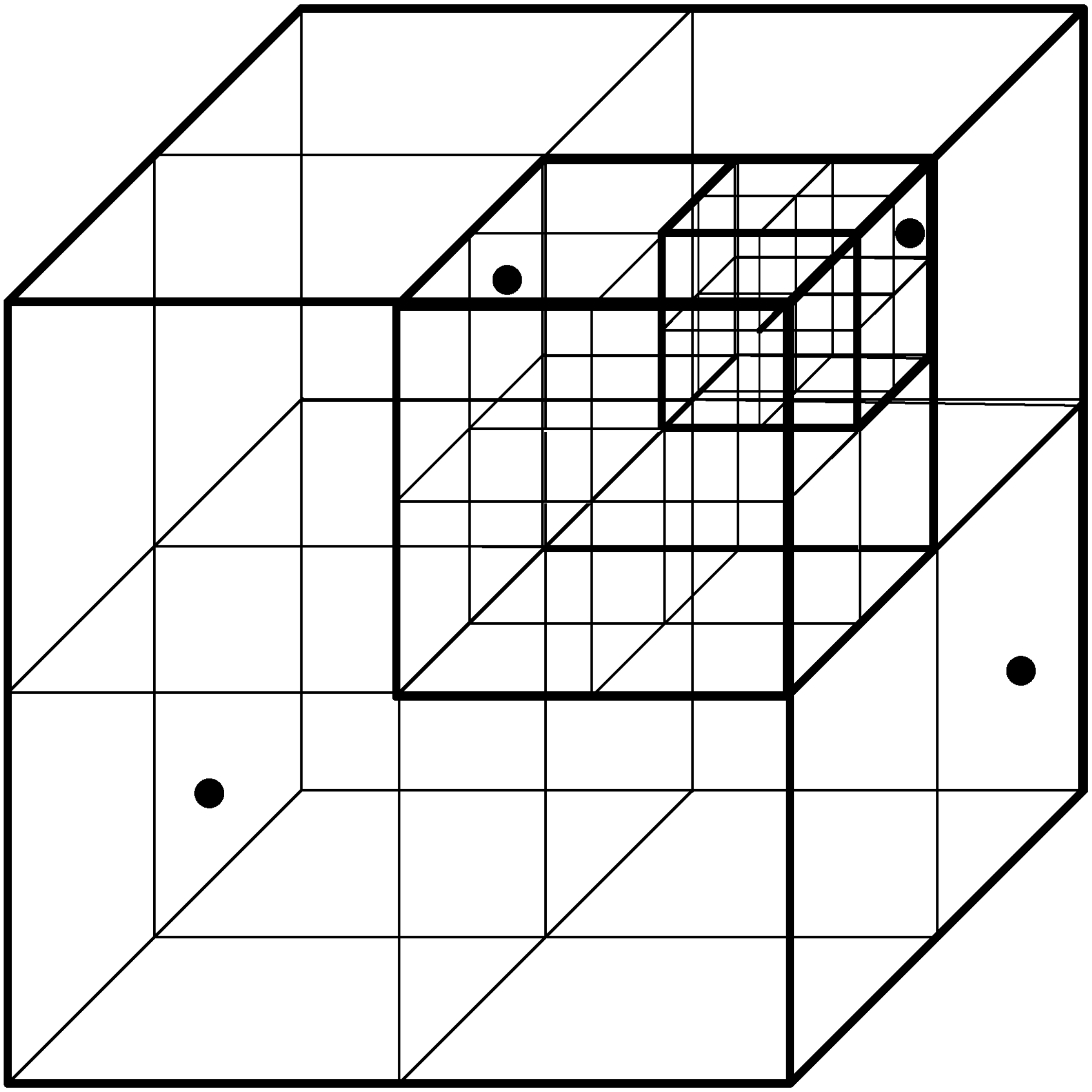
FIG. 4 is a conceptual diagram illustrating an example octree split for geometry coding.

For geometry, two different types of coding techniques exist: Octree and predictive-tree coding. The following is focuses on the octree coding. FIG. 4 is a conceptual diagram illustrating an example octree split for geometry coding. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position;

when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 5:
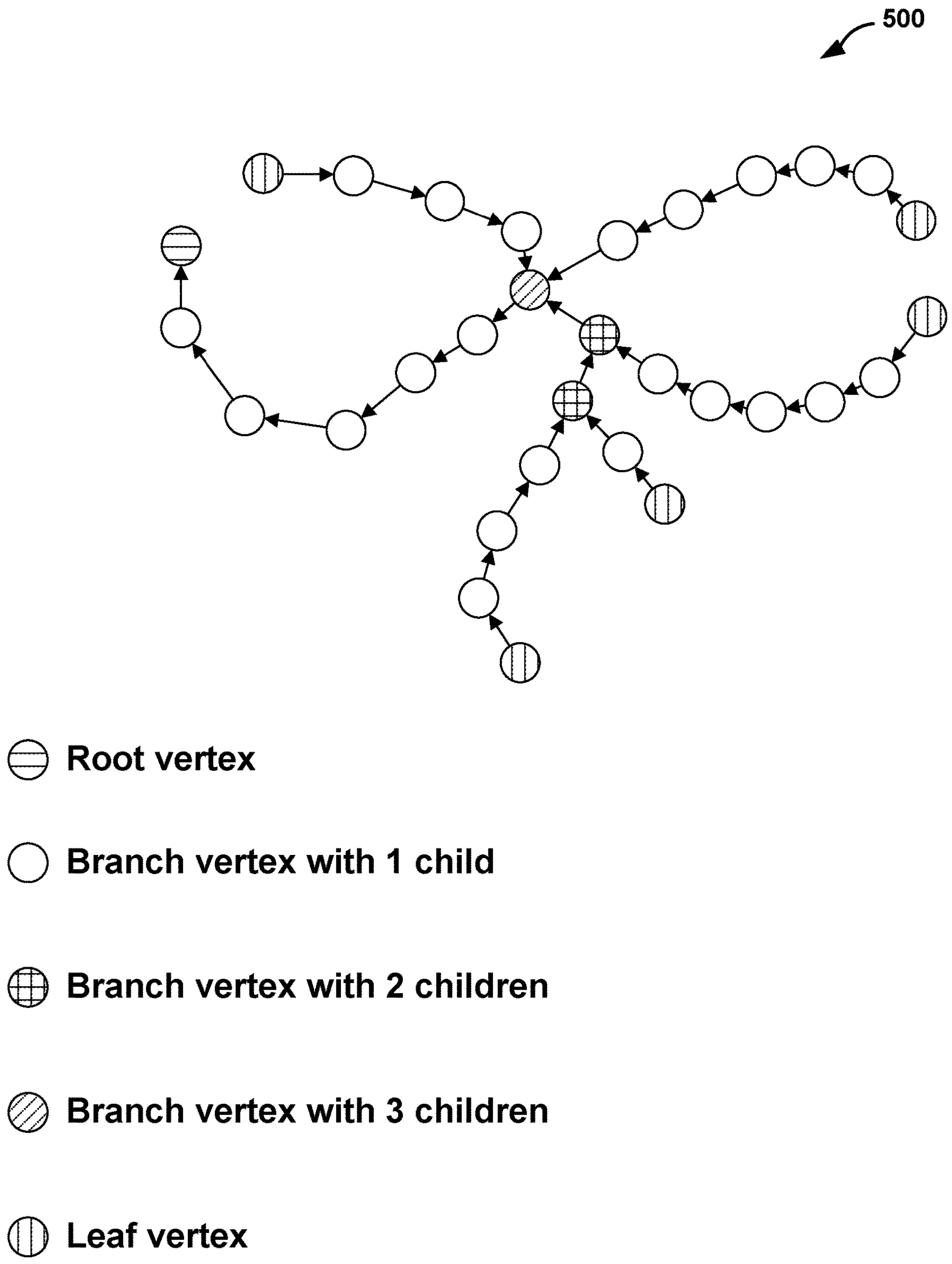
FIG. 5 is a conceptual diagram of a prediction tree for predictive geometry coding.

Predictive geometry coding was introduced as an alternative to the octree geometry coding, where the nodes are arranged in a tree structure (which defines the prediction structure), and various prediction strategies are used to predict the coordinates of each node in the tree with respect to its predictors. FIG. 5 is a conceptual diagram illustrating an example of a prediction tree 500, a directed graph where the arrow points to the prediction direction. The horizontally shaded node is the root vertex and has no predictors; the grid shaded nodes have two children; the diagonally shaded node has 3 children; the non-shaded nodes have one children and the vertically shaded nodes are leaf nodes and these have no children. Every node has only one parent node.

Four prediction strategies may be specified for each node based on its parent (p0), grand-parent (p1) and great-grand-parent (p2). The prediction strategies include, no prediction, delta prediction (p0), linear prediction (2*p0−p1), and parallelogram prediction (p0+p1−p2).

The encoder (e.g., G-PCC encoder 200) may employ any algorithm to generate the prediction tree; the algorithm used may be determined based on the application/use case and several strategies may be used. The encoder may encode, for each node, the residual coordinate values in the bitstream starting from the root node in a depth-first manner. Predictive geometry coding may be particularly useful for Category 3 (LIDAR-acquired) point cloud data e.g., for low-latency applications.

Figure 6A:
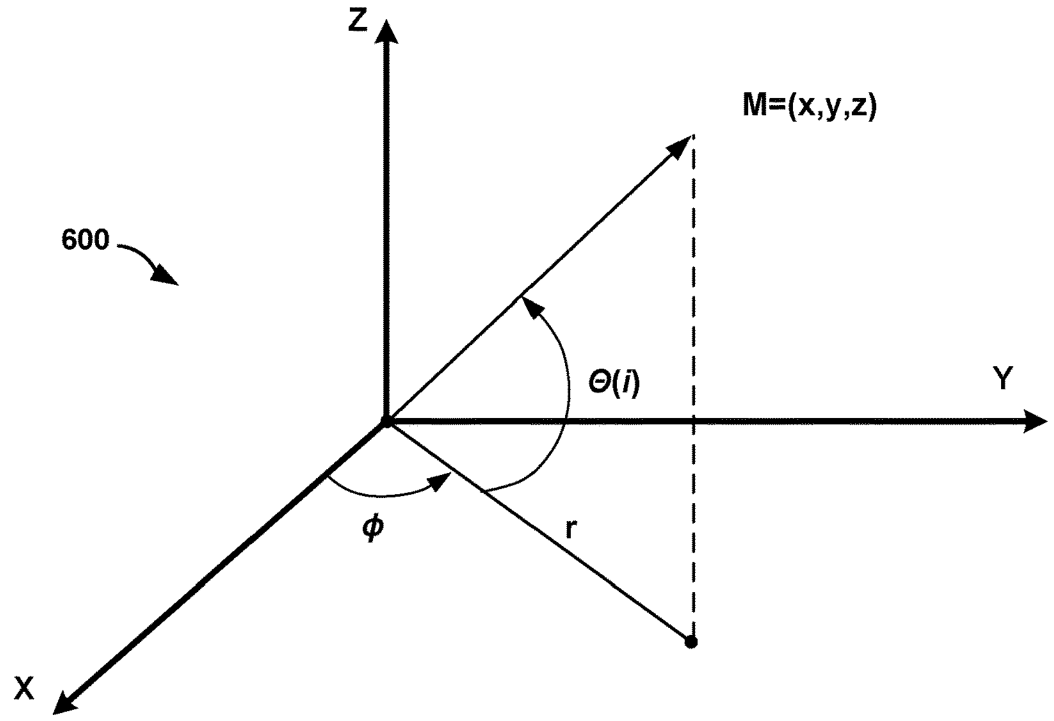
FIGS. 6A and 6B are conceptual diagrams of a spinning LIDAR acquisition model.
Figure 6B:
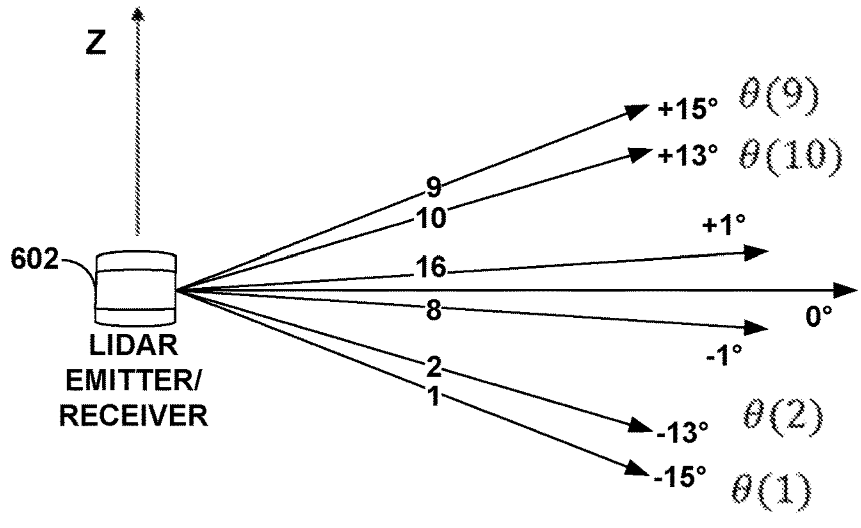

Angular mode may be used in predictive geometry coding, where the characteristics of LIDAR sensors may be utilized in coding the prediction tree more efficiently. The coordinates of the positions are converted to the (r, ϕ, i) (radius, azimuth, and laser index) and a prediction is performed in this domain (the residuals are coded in r, ϕ, i domain). Due to the errors in rounding, coding in r, ϕ, i is not lossless and hence a second set of residuals may be coded which correspond to the Cartesian coordinates. A description of the encoding and decoding strategies used for angular mode for predictive geometry coding is reproduced below. The description is based on FIGS. 6A and 6B, which are conceptual diagrams of a spinning LIDAR acquisition model.

The techniques of this disclosure may be applicable to at least point clouds acquired using a spinning Lidar model. Here, the lidar 602 has N lasers (e.g., N=16, 32, 64) spinning around the Z axis according to an azimuth angle ϕ (see FIGS. 6A and 6B). Each laser may have different elevation $\theta(i)_{i=1 \ldots N}$ and height $\zeta(i)_{i=1 \ldots N}$. The laser i hits a point M, with cartesian integer coordinates (x, y, z), defined according to coordinate system 600 described in FIG. 6A.

The position of M is modelled with three parameters (r, ϕ, i), which may be computed as follows:

$$r = \sqrt{x^2 + y^2}$$

$$\phi = \mathrm{atan2}(y, x)$$

$$i = \arg\min_{j=1 \ldots N} \{z + \varsigma(j) - r \times \tan(\theta(j))\},$$

The coding process may use the quantized version of (r, ϕ, i), denoted ($\tilde{r}$, $\tilde{\phi}$, i), where the three integers $\tilde{r}$, $\tilde{\phi}$ and i may be computed as follows:

$$\tilde{r} = \mathrm{floor}\left(\frac{\sqrt{x^2 + y^2}}{q_r} + o_r\right) = \mathit{hypot}(x, y)$$

$$\tilde{\phi} = \mathrm{sign}(\mathrm{atan2}(y, x)) \times \mathrm{floor}\left(\frac{|\mathrm{atan2}(y, x)|}{q_\phi} + o_\phi\right)$$

$$i = \arg\min_{j=1 \ldots N} \{z + \varsigma(j) - r \times \tan(\theta(j))\}$$

where ($q_r$, $o_r$) and ($q_\phi$, $o_\phi$) are quantization parameters controlling the precision of $\tilde{\phi}$ and $\tilde{r}$, respectively.

sign(t) is the function that returns 1 if t is positive and (−1) otherwise.

|t| is the absolute value of t.

To avoid reconstruction mismatches due to the use of floating-point operations, the values of $\zeta(i)_{i=1 \ldots N}$ and $\tan(\theta(i))_{i=1 \ldots N}$ may be pre-computed and quantized as follows:

$$\tilde{z}(i) = \mathrm{sign}(\varsigma(i)) \times \mathrm{floor}\left(\frac{|\varsigma(i)|}{q_\varsigma} + o_\varsigma\right)$$

$$\tilde{t}(i) = \mathrm{sign}\left(\varsigma(\tan(\theta(j))) \times \mathrm{floor}\left(\frac{|\tan(\theta(j))|}{q_\theta} + o_\theta\right)\right)$$

where ($q_\zeta$, $o_\zeta$) and ($q_\theta$, $o_\theta$) are quantization parameters controlling the precision of $\tilde{\zeta}$ and $\tilde{\theta}$, respectively.

The reconstructed cartesian coordinates are obtained as follows:

$$\hat{x} = \mathrm{round}\ (\tilde{r} \times q_r \times \mathrm{app\_cos}(\tilde{\phi} \times q_\phi))$$

$$\hat{y} = \mathrm{round}\ (\tilde{r} \times q_r \times \mathrm{app\_sin}(\tilde{\phi} \times q_\phi))$$

$$\hat{z}\mathrm{round}(\tilde{r} \times q_r \times \tilde{t}(i) \times q_\theta - \tilde{z}(i) \times q_\zeta),$$

where app_cos(·) and app_sin(·) are approximation of cos(·) and sin(·). The calculations could be using a fixed-point representation, a look-up table and linear interpolation.

In some examples, ($\hat{x}$, $\hat{y}$, $\hat{z}$) may be different from (x, y, z) due to various reasons, including:

quantization approximations model imprecision model parameters imprecisions

In some examples, the reconstruction residuals ($r_x$, $r_y$, $r_z$) can be defined as follows:

$$r_x = x - \hat{x}$$

$$r_y = y - \hat{y}$$

$$r_z = z - \hat{z}$$

In this method, the encoder (e.g., G-PCC encoder 200) may proceed as follows:

Encode the model parameters $\tilde{t}$(i) and $\tilde{z}$(i) and the quantization parameters $q_r$ $q_\zeta$, $q_\theta$ and $q_\phi$ Apply the geometry predictive scheme described in G-PCC DIS to the representation ($\tilde{r}$, $\tilde{\phi}$, i)

A new predictor leveraging the characteristics of lidar could be introduced. For instance, the rotation speed of the lidar scanner around the z-axis is usually constant. Therefore, the G-PCC decoder may predict the current $\tilde{\phi}$(j) as follows:

$$\tilde{\phi}(j) = \tilde{\phi}(j-1) + n(j) \times \delta_\phi(k)$$

Where $(\delta_\phi(k))_{k=1 \ldots K}$ is a set of potential speeds the encoder could choose from. The index k could be explicitly written to the bitstream or could be inferred from the context based on a deterministic strategy applied by both the encoder and the decoder, and n(j) is the number of skipped points, which could be explicitly written to the bitstream or could be inferred from the context based on a deterministic strategy applied by both the encoder and the decoder.

Encode with each node the reconstruction residuals ($r_x$, $r_y$, $r_z$)

The decoder (e.g., G-PCC decoder 300) may proceed as follows:

Decode the model parameters $\tilde{t}$(i) and $\tilde{z}$(i) and the quantization parameters $q_r$ $q_\zeta$, $q_\theta$ and $q_\phi$ Decode the ($\tilde{r}$, $\tilde{\phi}$, i) parameters associated with the nodes according to the geometry predictive scheme described in G-PCC Draft International Standard (DIS)

Compute the reconstructed coordinates ($\hat{x}$, $\hat{y}$, $\hat{z}$) as described above Decode the residuals ($r_x$, $r_y$, $r_z$)

As discussed in the next section, lossy compression could be supported by quantizing the reconstruction residuals ($r_x$, $r_y$, $r_z$)

Compute the original coordinates (x, y, z) as follows $$x = r_x + \hat{x}$$

$$y = r_y + \hat{y}$$

$$z = r_z + \hat{z}$$

Lossy compression could be achieved by applying quantization to the reconstruction residuals ($r_x$, $r_y$, $r_z$) or by dropping points.

The quantized reconstruction residuals are computed as follows:

$$\tilde{r}_x = \mathrm{sign}(r_x) \times \mathrm{floor}\left(\frac{|r_x|}{q_x} + o_x\right)$$

$$\tilde{r}_y = \mathrm{sign}(r_y) \times \mathrm{floor}\left(\frac{|r_y|}{q_y} + o_y\right)$$

$$\tilde{r}_z = \mathrm{sign}(r_z) \times \mathrm{floor}\left(\frac{|r_z|}{q_z} + o_z\right)$$

Where ($q_x$, $o_x$), ($q_y$, $o_y$) and ($q_z$, $o_z$) are quantization parameters controlling the precision of $\tilde{r}_x$, $\tilde{r}_y$ and $\tilde{r}_z$, respectively.

In some examples, G-PCC encoder 200 and/or G-PCC decoder 300 may use Trellis quantization to further improve the RD (rate-distortion) performance results. The quantization parameters may change at sequence/frame/slice/block level to achieve region adaptive quality and for rate control purposes.

Predictive geometry coding may use a prediction tree structure to predict the positions of the points. When angular coding is enabled, the x, y, z coordinates may be transformed to radius, azimuth and laserID and residuals are signalled in these three coordinates as well as in the x, y, z dimensions. The intra prediction used for radius, azimuth and laserID may be one of four modes and the predictors are the nodes that are classified as parent, grand-parent and great-grand-parent in the prediction tree with respect to the current node. The predictive geometry coding, as currently designed in G-PCC Ed. 1, is an intra coding tool as it only uses points in the same frame for prediction.

The aforementioned techniques may present one or more disadvantages. Predictive geometry coding takes advantage of the mechanism of spinning LIDARs to predict the position of one point from another in the point cloud. However, this mechanism is restricted to points within the same point cloud frame. No information from points in a previously coded frame (i.e., a reference frame) may be used for the prediction.

A G-PCC coder (e.g., G-PCC encoder 200 and/or G-PCC decoder 300) may perform point cloud compression using inter-prediction. By using inter-prediction, the G-PCC coder may use redundancy of points across frames to provide additional bit rate savings.

The G-PCC coder may determine whether to code a point using inter-prediction or intra prediction. As one example, the G-PCC encoder may perform an analysis to determine it whether would be beneficial (e.g., in terms of bitrate or other conditions) to code a particular point using inter or intra prediction. As another example, the G-PCC decoder may decode a syntax element (e.g., a flag) that indicates whether the point is coded using inter or intra prediction.

Inter prediction was proposed to predict the radius of a point from a reference frame. For each point in the prediction tree, the G-PCC coder may determine whether the point is inter predicted or intra predicted (indicated by a flag). When intra predicted, the intra prediction modes of predictive geometry coding are used. When inter-prediction is used, the azimuth and laserID are still predicted with intra prediction, while the radius is predicted from the point in the reference frame that has the same laserID as the current point and an azimuth that is closest to the current azimuth. In some examples, the azimuth and/or laserID may be inter predicted in addition to, or in place of, the radius. When inter-coding is applied, the radius, azimuth and laserID of the current point may be predicted based on a point that is near the azimuth position of a previously decoded point in the reference frame. In addition, separate sets of contexts may be used for inter and intra prediction.

The G-PCC coder may choose a reference frame. In some examples, the G-PCC coder may use a previously decoded frame (or in some cases the preceding frame in decoding order) as the reference frame. In other examples, an indication of a frame number (using LSB values or delta frame number values) may be used to specify a reference frame. More generically, two or more frames may be specified as reference frames and a point may be coded with inter-prediction from any of the reference frames (indication of the reference frame associated with the point may be signaled or derived).

In another example, prediction may be performed from two or more frames (e.g., bi-prediction). As such, a G-PCC coder may predict a point of a current frame based on a reference point in a first reference frame and a reference point in a second reference frame.

The G-PCC coder may utilize a plurality of inter-prediction modes. When a point is inter-predicted, there may be one or more ways to predict the point from a reference frame. Different mode values may be used to specify each type of prediction (e.g., a G-PCC coder may signal a syntax element that indicates an inter prediction mode used for a current point). As one example inter prediction mode, a point may be predicted from a zero-motion candidate from a reference frame (e.g., a reference point in the reference frame may be a zero-motion candidate). As another example inter prediction mode, a point may be predicted from a global motion candidate from a reference frame. As another example inter prediction mode, a point may be predicted from a candidate point from a reference frame, and other parameters (e.g., motion vector, etc.) may be used to specify the candidate point.

Figure 7:
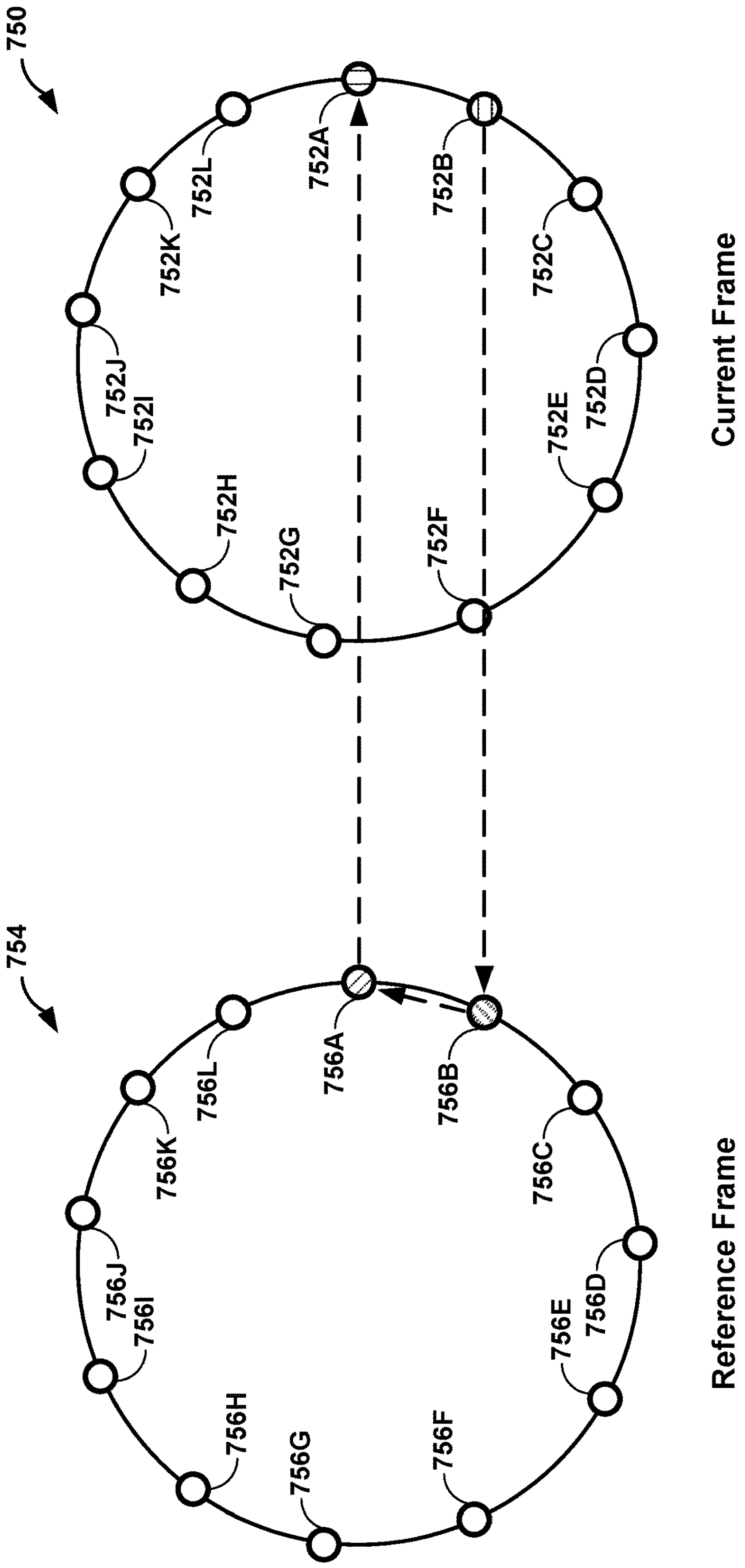
FIG. 7 is a conceptual diagram illustrating an example of the method in m56841.

FIG. 7 is a conceptual diagram illustrating an example inter prediction process for predicting points of a point cloud, in accordance with one or more aspects of this disclosure. As shown in FIG. 7, current frame 750 may include a plurality of points 752A-752L (collectively, "points 752") and reference frame 754 may include a plurality of points 756A-756L (collectively, "points 756"). Reference frame 754 may be a frame that is encoded and/or reconstructed prior to current frame 750 being decoded and/or reconstructed (e.g., reference frame 754 may precede current frame 750 in a coding order). A G-PCC coder may utilize intra prediction to predict one or more of points 752 of current frame 750 based on one or more of points 756 of reference frame 754. For instance, a G-PCC decoder (or a reconstruction loop of a G-PCC encoder) may predict one or more parameters (e.g., (r, $\phi$, i) of current point 752A (curPoint) of points 752 based on one or more of points 756.

To perform intra prediction to predict a current point in a current frame, the G-PCC coder may determine a reference point in a reference frame that is different than the current frame and predict one or more parameters of the current point based on the reference point. For instance, to predict current point 752A, the G-PCC coder may determine reference point 756A (e.g., interPredPt) and predict one or more parameters of current point 752A based on one or more parameters of reference points 756A. The determined reference point may be referred to as an identified reference point.

The G-PCC coder may determine the reference point using any suitable technique. As one example, the G-PCC coder may determine, in the current frame, a pivot point that precedes the current point in a coding order; and determine, based on one or more parameters of the pivot point, the reference point. For instance, where the coding order is counter-clockwise, the G-PCC coder may determine that point 752B is the previous point of current point 752A (e.g., the point that immediately precedes the current point in the coding order, prevDecP0) (i.e., determine that point 752B is the pivot point), and determine a reference point based on one or more parameters of pivot point 752B.

To determine the reference point based on the one or more parameters of the pivot point, the G-PCC coder may determine, in the reference frame, a reference pivot point based on an azimuth of the pivot point; and determine the reference point based on the reference pivot point. For instance, the G-PCC coder may determine, in reference frame 754, a point having a same azimuth (or same azimuth and same laser ID) as pivot point 752B. In the example of FIG. 7, the G-PCC coder may determine that point 756B (e.g., refFrameP0) is the reference pivot point as point 756B bas a same azimuth as pivot point 752B. While the reference pivot point in the example of FIG. 7 corresponds to an actual point (e.g., an actual point in frame 754), the techniques of this disclosure are not necessarily so limited. For instance, in some examples, the reference pivot point may be a virtual point that does not correspond to a reconstructed point in reference frame 754.

In some examples, the G-PCC coder may determine the reference pivot point based on an actual (e.g., unscaled) azimuth of the pivot point. In other examples, the G-PCC coder may determine the reference pivot point based on a scaled azimuth of the pivot point. For instance, the G-PCC coder may determine the scaled azimuth by scaling the azimuth of the pivot point by a constant value.

To determine the reference point based on the reference pivot point, the G-PCC coder may identify, as the reference point in the reference frame, a point having an azimuth that greater than an azimuth of the reference pivot point. For instance, the G-PCC coder may determine which of points 756 have azimuth values greater than an azimuth value of the reference pivot point, and select (from the set of points 756 having azimuth values greater than the azimuth value of the reference pivot point) the point having the smallest azimuth value. In this example of FIG. 7, point 756A may be the point in reference frame 754 that has the smallest azimuth that is larger than the azimuth of reference pivot point 765B. As such, the G-PCC coder may identify point 756A as the reference point for performing intra prediction of current point 752A.

In some examples, the G-PCC coder may determine the reference point based on an actual (e.g., unscaled) azimuth of the reference pivot point. In other examples, the G-PCC coder may determine the reference point based on a scaled azimuth of the reference pivot point. For instance, the G-PCC coder may determine the scaled azimuth of the reference pivot point by scaling the azimuth of the pivot point by a constant value. As such, in some examples, the G-PCC coder may determine the reference point by identifying, as the reference point, a point having a smallest scaled azimuth that is larger than the scaled azimuth of the reference pivot point (e.g., point 756A). In some examples, the G-PCC coder may utilize the point with the second smallest azimuth greater than the scaled azimuth. For instance, the G-PCC coder may determine the reference point by identifying, as the reference point, a point having a second smallest scaled azimuth that is larger than the scaled azimuth of the reference pivot point (e.g., point 756L).

The G-PCC coder may predict parameters of current point 752A based on parameters of reference point 756A. For instance, the G-PCC coder may signal a residual data that represents differences between parameters of current point 752A and reference point 756A. The G-PCC decoder may add the residual data to the parameters of reference point 756A to reconstruct the parameters of current point 752A.

While discussed above as using a single reference point in a single reference frame, the techniques of this disclosure are not so limited. As one example, multiple reference points in a single reference frame may collectively be used to predict the current point. For instance, the G-PCC coder may determine, in a reference frame and based on a reference pivot point, a plurality of reference points. The G-PCC coder may predict one or more parameters of a current point in a current frame based on the plurality of reference points. As another example, reference points from multiple reference frames may be used to predict the current point.

As discussed above, a G-PCC coder may perform azimuth prediction. Let (r, phi, laserID) be the three coordinates of the pivot point (referred to as radius, azimuth and laser ID) in the spherical coordinate system. Techniques disclosed herein may also apply to other coordinate systems.

In some examples, the G-PCC coder may code points in the current point cloud frame in an ordered fashion as follows:

1. For a current point in the current frame, the G-PCC coder may choose a pivot point in the current frame that is preceding the first point in decoding order. In some examples, the pivot point is the preceding point in the current frame in the decoding order. In some examples, the pivot point is the second preceding point in the current frame in the decoding order. More generally, more than one preceding point may be chosen as pivot points of the current point. In some examples, the pivot point may be a virtual point derived based on a previously decoded point in the current frame and azimuth displacement that are a multiple of azimuth quantization scale value (pre-determined or derived from signaled syntax elements).
2. The G-PCC coder may choose a point in reference frame, reference pivot point, that is associated with the pivot point. The reference pivot point may be chosen as a point in the reference frame that has the same azimuth and laser ID as the pivot point. In some examples, points with other laser ID values may also be candidates for reference pivot point (e.g., the reference pivot point may be chosen as the point in the reference frame that has the same azimuth as the pivot point and laser ID in the range of [LaserID−M, LaserID+M], where LaserID is the laser ID of the pivot point and M is a fixed value (e.g., 1) or chosen based on distance of the pivot point from the origin, or derived as function of LaserID (e.g., for smaller values of LaserID, M may be smaller and for larger values of LaserID, M may be larger)). In some examples, a distance metric may be defined using azimuth and laser ID, and the reference pivot point is chosen as the point that has smallest distance from the azimuth and laser ID of the pivot point using the distance metric. A normalized azimuth value may be obtained by scaling the azimuth by a first constant value; a normalized laser ID may be obtained by scaling the laserID by a second constant value; the distance metric may be obtained by computing a norm (e.g., L2-norm, L1-norm) for the normalized laser ID and azimuth value of the pivot point and the reference points. More generally, the reference pivot point may be chosen as a point in the reference frame that is in the neighbourhood of points with the same azimuth and laser ID as the pivot point. In some examples, the reference pivot point may be a virtual point in the reference frame that is derived from the pivot point that has the same azimuth and laser ID as the pivot point.
3. The G-PCC coder may choose a reference point in the reference frame that is associated with the reference pivot point. The reference point may be chosen as the point in the reference frame that has the smallest azimuth that is larger than that of reference pivot point and the same laser ID as the reference pivot point. The reference point may be chosen as the point in the reference frame that has the second smallest azimuth that is larger than that of reference pivot point and the same laser ID as the reference pivot point. In some examples, when the reference point is not available, inter prediction may be disabled for the current point. In some examples, the reference point may be chosen as the reference pivot point.

4. The G-PCC coder may compute a first residual between the reference point and the reference pivot point.
5. The G-PCC coder may use the first residual to derive a first prediction for the current value. The prediction may be derived by adding the components of the first residual to the respective components of the pivot point (e.g., the radius prediction may be obtained by adding the radius component of the first residual to the radius component of the pivot point (similarly for azimuth)). In some examples, the first prediction may be set equal to the reference point.
6. The G-PCC coder may code a second residual between the first prediction and the position of the current point.
7. Composition of residual: one or more residuals disclosed in this disclosure may include one or more of the following: The residual may comprise a radius residual between the reference pivot point and the reference point. The residual may comprise an azimuth residual between the reference pivot point and the reference point.
8. The G-PCC coder may derive a current point based on the first prediction and second residual. In some examples, the G-PCC coder may derive the current point from the second residual (e.g., and not based on the first prediction).

The G-PCC coder may apply one or more techniques described above to a quantized azimuth value; the scale value used for the quantization may be derived from signaled values or pre-determined. The quantized azimuth value and laserID may be used to search an inter predicted point in the reference. For example, the azimuth of a previously decoded and reconstructed point may be quantized and an inter predicted point with a quantized azimuth and laserID that is closest to the quantized azimuth and laserID of the previous point may be selected as predictor for the azimuth, radius and laserID of the current point, either as quantized/dequantized predictor or unquantized.

The G-PCC coder may apply one or more techniques described above to a quantized laserID value; the scale value used for the quantization may be derived from signaled values or pre-determined. The azimuth and quantized laserID value may be used to search an inter predicted point in the reference. For example, the laserID of a previously decoded and reconstructed point may be quantized and an inter predicted point with an azimuth and quantized laserID that is closest to the azimuth and quantized laserID of the previous point may be selected as predictor for the azimuth, radius and laserID of the current point, either as quantized/dequantized predictor or unquantized.

The G-PCC coder may apply one or more techniques described above to a quantized azimuth and quantized laserID value; the scale values used for the quantization may be derived from signaled values or pre-determined. The quantized azimuth and quantized laserID value may be used to search an inter predicted point in the reference. For example, the azimuth and laserID of a previously decoded and reconstructed point may be quantized and an inter predicted point with a quantized azimuth and quantized laserID that is closest to the quantized azimuth and quantized laserID of the previous point may be selected as predictor for the azimuth, radius and laserID of the current point, either as quantized/dequantized predictor or unquantized.

In some examples, the reference frame may refer to a set of (radius, azimuth, laserID) tuples that are derived from the reference frame. For example, for each point in the reference frame, the G-PCC coder may add a radius, azimuth, laser ID to the set if there is no other point in the set that has the same azimuth the laser ID. In some cases, a quantized value of azimuth may be added. In some cases, a (r, phi, laserID) may be added even if there is another tuple in the set with same phi and laserID, e.g., (r1, phi, laserID), if the value of r is less than the value or r1 (in this case, the tuple (r1, phi, laserId) that was present may be replaced by the new (r, phi, laserID)). In some cases, the points in the reference frame may be in the x,y,z domain; the points may be stored for reference as is, or by converting it to the spherical domain. In some cases, a motion compensated position may be added to the reference frame. The compensation may be based on a motion vector (e.g., global motion vector with rotation and/or translation) signaled that is associated with the current frame and reference frame.

Figure 8:
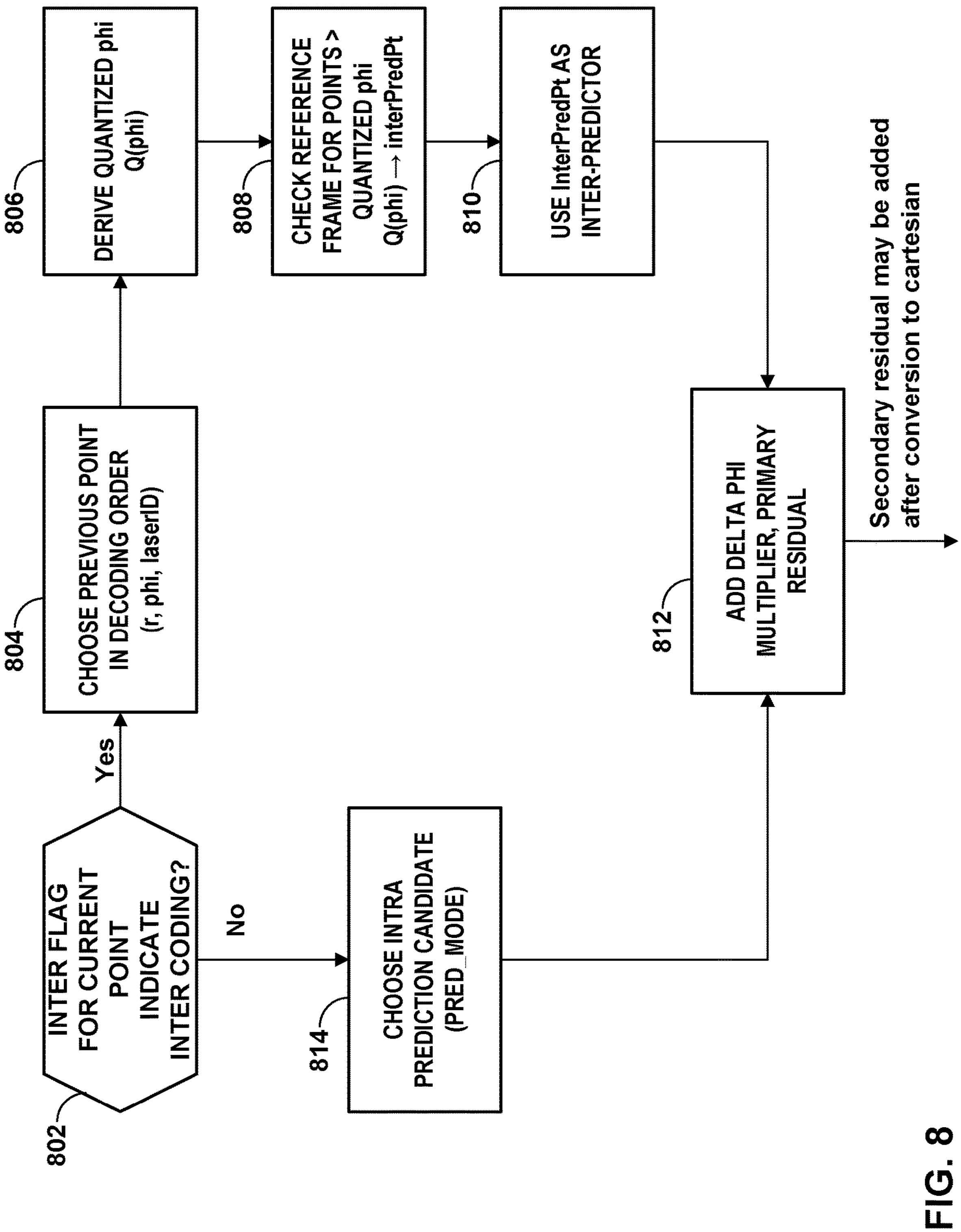
FIG. 8 is a flow diagram illustrating an example decoding flow associated with the "inter_flag" that is signaled for every point.

FIG. 8 is a flow diagram illustrating an example decoding technique for inter and intra coding of points of a point cloud. As shown in FIG. 8, an inter flag may be coded for each point of a point cloud. For instance, a G-PCC coder may determine whether an inter flag for a current point indicates inter coding (802). Where the inter flag for the current point does indicate inter coding ("Yes" branch of 802), the G-PCC coder may choose a previous point in decoding order (804), derive quantized phi (Q(phi)) (806), check a reference frame for points having a quantized phi greater than the derived quantized phi (808), use the inter-predpt as inter-predictor (810), and add delta phi multiplier and primary residual (812). Where the inter flag for the current point does not indicate inter coding ("No" branch of 802), the G-PCC coder may choose an inter prediction candidate (pred_mode) (814), and add delta phi multiplier and primary residual (812).

Figure 9:
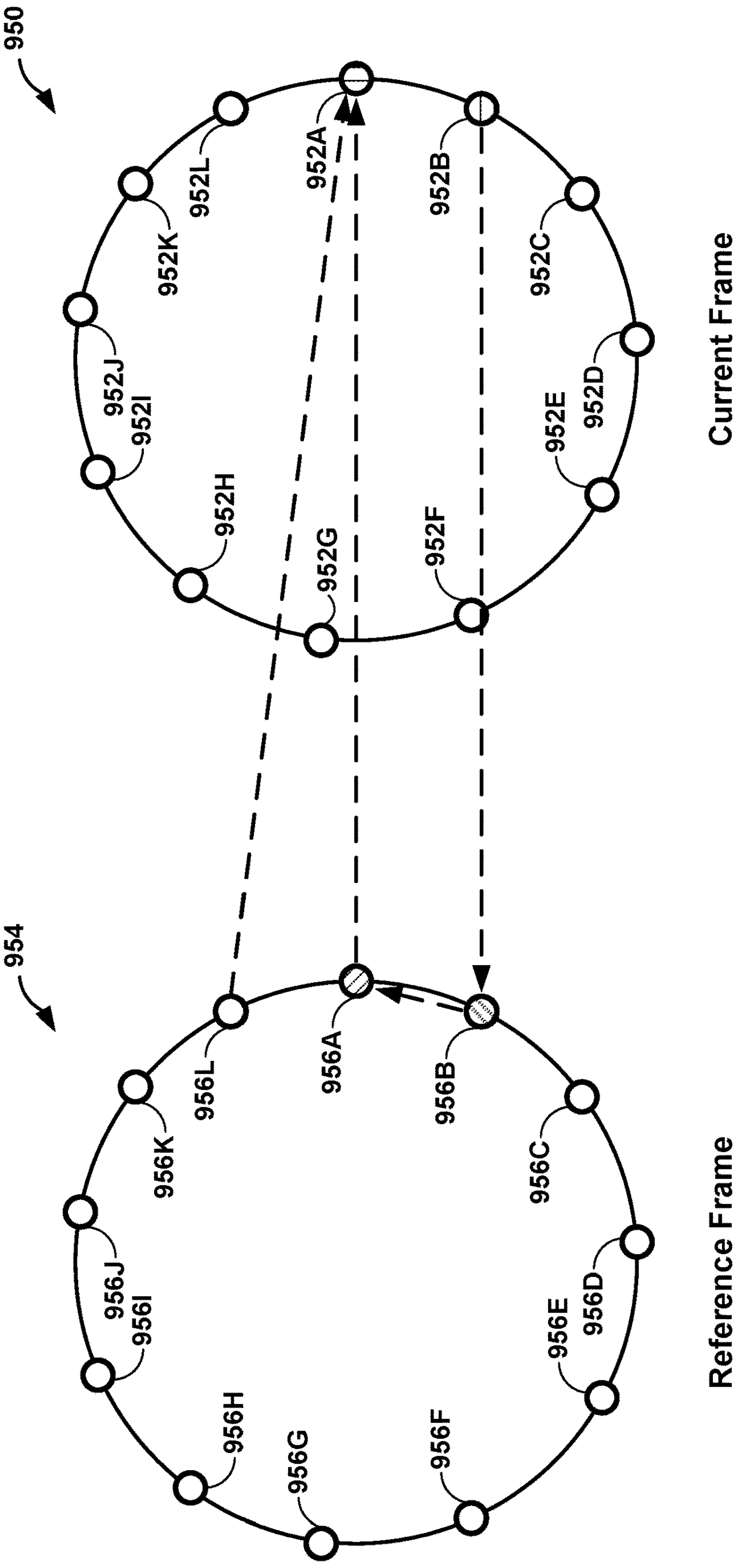
FIG. 9 illustrates an example of such an additional inter predictor point that has an azimuth greater than the inter predictor point.

FIG. 9 illustrates an example of such an additional inter predictor point that has an azimuth greater than the inter predictor point. As shown in FIG. 9, current frame 950 may include a plurality of points 952A-952L (collectively, "points 952") and reference frame 954 may include a plurality of points 956A-956L (collectively, "points 956"). Reference frame 954 may be a frame that is encoded and/or reconstructed prior to current frame 950 being decoded and/or reconstructed (e.g., reference frame 954 may precede current frame 950 in a coding order). A G-PCC coder may utilize intra prediction to predict one or more of points 952 of current frame 950 based on a plurality of points 956 of reference frame 954. For instance, a G-PCC decoder (or a reconstruction loop of a G-PCC encoder) may predict one or more parameters (e.g., (r, $\phi$, i) of current point 952A (curPoint) of points 952 based on one or more of points 956 (e.g., points 956A and 956L).

In the inter prediction method for predictive geometry described above, the radius, azimuth and laserID of the current point are predicted based on a point that is near the collocated azimuth position in the reference frame when inter coding is applied using the following steps:

a) for a given point (952A), choose the previous decode point (952B),
b) choose a position in the reference frame that has the same scaled azimuth and laserID as the previous decode point (956B), c) choose a position in the reference frame from the first point that has azimuth greater than the position, to be used as the inter predictor point (956A).

In accordance with one or more techniques of this disclosure, a G-PCC coder may add additional inter predictor point that is obtained by finding the first point that has azimuth greater than the inter predictor point (956L). Additional signaling may be used to indicate which of the predictors is selected if inter coding has been applied.

An improved context selection algorithm may be applied for coding the inter prediction flag. The inter prediction flag values of the N (e.g., 2, 3, 4, 5, 6, 7) previously coded points may be used to select the context of the inter prediction flag in predictive geometry coding.

The aforementioned techniques may present one or more disadvantages. When inter prediction coding is enabled for a slice/frame that is coded with predictive geometry, an inter prediction flag is signalled for each point in the slice/frame. Point clouds typically have several thousands of points, and the cost of signalling an inter prediction flag for each point may be high (even when arithmetic coding). Similarly, an inter prediction mode is also signalled for each inter predicted point. Reducing the signalling can improve the compression efficiency of inter coding. One or more techniques disclosed in this document may be applied independently or in a combined way.

Although the discussion is predominantly on the polar coordinate system, techniques disclosed in this application may also apply to other coordinate system such as Cartesian, spherical, or any custom coordinate system that may be used to represent/code the point cloud positions and attributes. In particular, GPCC utilizes the radius and azimuthal angle from the spherical coordinate system in combination with a laser identifier (cfr., elevation angle) from the LiDAR sensor that captured the point.

In accordance with one or more aspects of this disclosure, a G-PCC coder may signal syntax elements that apply to groups of points of a point cloud (i.e., more than one point). For instance, as opposed to separately signaling an inter mode flag for each point of a point cloud, the G-PCC coder may signal a single inter mode flag that indicates whether all points in a group of points are coded using inter prediction. As such, the G-PCC coder may avoid having to signal a separate inter mode flag for each point. In this way, aspects of this disclosure may improve efficiency (e.g., reduce bandwidth usage) of point cloud compression.

A set of points may be specified/defined as a group of points (GoPt). In some examples, the set of points may be chosen as two or more points that are consecutive in decoding order. In some examples, the set of points may be chosen as two or more points that share a common characteristic, e.g., points that have the same laser ID, and/or points whose azimuth values are within an azimuth value range; or points that have the same laser ID and the difference between the maximum and minimum azimuth values of points in the set is less than a threshold. In some examples, the set of points may have a same azimuth value and laser ID value, but various radius values. In some examples, the set of points may have a same azimuth value and radius value, but various laser ID values. In some examples, the set of points may be grouped by either azimuth, radius, or laser ID values, or any combination.

Points may be included in a single group. As such, the groups of points may be considered to be non-overlapping.

The number of points in a GoPt may be determined by one or more of the following techniques. The number of points in a GoPt may be a fixed number of points may be pre-determined by the encoder and decoder. Where the number of points is fixed and pre-determined, no signalling may be needed. Additionally or alternatively, the number of points may be signalled/derived from one or more syntax elements in the bitstream. For instance, a G-PCC coder may signal a syntax element specifying the number of points in a GoPt in the bitstream. The specified number of points may apply to one or more GoPt. The number of points in a GoPt may be less than a number of points included in a frame. As such, a GoPt may include a subset of points of a frame.

In some examples, the number of points in a GoPt may be variable. As one example, the number of points in a GoPt may be variably derived as follows: for each GoPt, the number of points in the GoPt may be signalled (e.g., a syntax element num may specify that the current point and the (num-1) subsequent points belong to a GoPt). As one example, the number of points in a GoPt may be variably derived as follows: for each GoPt, a flag or syntax element may be signalled to indicate the start/end of a GoPt. (e.g., a value of 1 may specify that the point is the first point in a new GoPt, and a value of 0 may specify that the point belongs to an existing GoPt/same GoPt as the previous point).

The number of points in one or more GoPts may be chosen differently from the techniques described above. In some examples, the number of points that are left to be coded in the point cloud may be less than the number of points as specified by one of the methods above. In some of such cases, the remaining points to be coded may be chosen as one GoPt.

One or more syntax elements may be shared by points belonging to a GoPt. By sharing one or more syntax elements between points belonging to a GoPt, the techniques of this disclosure enable a signalling benefit as these syntax elements may not be signalled for each point in the GoPt (e.g., thereby reducing a number of bits used to signal a point cloud).

As one example, the G-PCC coder may signal the prediction type, such as inter prediction flag, once for a GoPt and apply the value to all points in the GoPt. For instance, responsive to decoding an inter prediction flag equal to 1 (indicating inter prediction) for a GoPt, the G-PCC decoder may decode all the points in the GoPt using inter prediction. Similarly, responsive to decoding an inter prediction flag equal to 0 (indicating intra prediction) for a GoPt, the G-PCC decoder may decode all the points in the GoPt using intra prediction.

As another example, the G-PCC coder may signal the inter prediction mode once for a GoPt that is coded with inter prediction, and apply the mode to all points in the GoPt. For instance, responsive to decoding the inter prediction mode 0 for a GoPt, the G-PCC decoder may decode all points in the GoPt using inter prediction mode 0.

As another example, the G-PCC coder may derive or infer some point coordinate characteristics (e.g., radius, laser ID, etc.) to be the same for all points in a GoPt. As such, the G-PCC coder may signal the radius and/or laserID residual once to derive the radius and/or laserID of a first point in the GoPt, and the G-PCC coder may infer the radius and/or laserID of all the other points in the GoPt to be the same as the first point.

As another example, the G-PCC coder may specify some point coordinate characteristics to have a certain relation between points belonging to a GoPt. For example, the G-PCC coder may infer the azimuth of successive points in a GoPt to be differing by a fixed value (e.g., positionAzimuthSpeed—a value determined by the azimuth bitdepth and the number of points per laser rotation/sampling rate of the laser). In some examples, the G-PCC coder may signal delta qphi value (delta quantized azimuth) for a GoPt to derive the qphi for a first point in the GoPt and the qphi of the other points in the GoPt may be derived from the azimuth of the first point (e.g., inferring delta qphi value of 1 for all points other than first point). In some examples, this may apply to an approximated azimuth.

Although some of the techniques disclosed are described above for inter prediction, some techniques may also apply to intra prediction. For example, a GoPt may be specified for points in intra coded frames; or points in a GoPt may be coded using intra prediction in frames where inter prediction may be enabled. An intra prediction mode X value may be signalled for a GoPt and all the points in the GoPt are coded with the same intra prediction mode X.

Referring to the possible definitions for GoPt as described above, the type of the group may be signalled in the bitstream, potentially per GoPt or at a higher-level concept such as slice or frame, group of frames, or sequence. For example, the type may indicate whether the group of points has the same laserID, but various azimuths and radius values, or in another example, the GoPt has the same laserID and azimuth, but various radius values.

The following detailed examples may illustrate the aforementioned techniques.

In a first example, the inter prediction flag and the inter prediction mode may be shared by all the points in a GoPt. The size of the GoPt may be signalled in the bitstream (in this example, it is signalled in the geometry data unit but the signalling may occur in other syntax structures too).

Additions with respect to the GPCC (Ed.1) syntax and semantics for the first example are shown with <ADD> . . . </ADD> tags, and removals are shown with <DELETE> . . . </DELETE> tags.

Geometry predictive tree syntax

```
                                                    Descriptor
geometry_predtree_data( ) {
  PtnNodeIdx = 0
  <ADD>ptn_group_size_minus1                        ue(v) </ADD>
  do {
    <ADD> PtnNodeCnt = 0 </ADD>
    geometry_predtree_node(0, PtnNodeIdx )
    gpt_end_of_trees_flag                           ae(v)
  } while( !gpt_end_of_trees_flag )
}
```

<ADD>ptn_group_size_minus1 plus 1 specifies the number of points in each GoPt in the syntax structure geometry_predtree_data( ) PtnGroupSize is set equal to ptngroup_size_minus1+1. </ADD>

The ptn_group_size_minus1 syntax element may be an example of a syntax element having a value that represents a number of points in a group of points.

Geometry predictive tree node syntax

```
                                                                        Descriptor
geometry_predtree_node( depth, nodeIdx ) {
  if( geom_scaling_enabled_flag && !( nodeIdx % PtnQpInterval ) ) {
    ptn_qp_offset_abs_gt0_flag                                          ae(v)
    if( ptn_qp_offset_abs_gt0_flag ) {
      ptn_qp_offset_abs_minus1                                          ae(v)
      ptn_qp_offset_sign_flag                                           ae(v)
    }
  }
  if( duplicate_points_enabled_flag ) {
    ptn_point_cnt_gt1_flag [Ed, dup points?]                            ae(v)
    if( ptn_point_cnt_gt1_flag )
      ptn_point_cnt_minus2                                              ae(v)
  }
  ptn_child_cnt[ nodeIdx ]                                              ae(v)
  if(InterEnableFlag && <ADD> (PtnNodeCnt % PtnGroupSize == 0)
</ADD>) {
    ptn_inter_flag[ nodeIdx ]                                           u(1)
    if (ptn_inter_flag[ nodeIdx ] )
      ptn_inter_pred_mode[ nodeIdx ]                                    u(1)
  }
  if( !ptn_inter_flag[ nodeidx ] )
    ptn_pred_mode[ nodeIdx ]                                            ae(v)
  if( geometry_angular_enabled_flag ) {
    ptn_phi_mult_abs_gt0_flag                                           ae(v)
    if( ptn_phi_mult_abs_gt0_flag ) {
      ptn_phi_mult_abs_gt1_flag                                         ae(v)
      if( ptn_phi_mult_abs_gt1_flag )
        ptn_phi_mult_abs_minus2                                         ae(v)
      if( ptn_phi_mult_abs_minus2 = = 7 )
        ptn_phi_mult_abs_minus9                                         ae(v)
      ptn_phi_mult_sign_flag                                            ae(v)
    }
  }
  numComp = geometry_angular_enabled_flag
&& !number_lasers_minus1 ? 2 : 3
  for( k = 0; k < numComp; k++ ) {
    ptn_residual_abs_gt0_flag[ k ]                                      ae(v)
    if( ptn_residual_abs_gt0_flag[ k ] ) {
      ptn_residual_abs_log2[ k ]                                        ae(v)
      ptn_residual_abs_remaining[ k ]                                   ae(v)
      if( k || ptn_pred_mode[ nodeIdx ] ||
ptn_inter_flag[ nodeIdx ] )
        ptn_residual_sign_flag[ k ]                                     ae(v)
```

-continued

| | Descriptor |
|---|---|
| } | |
| } | |
| if( geometry__angular__enabled__flag ) | |
| for( k = 0; k < 3; k++ ) { | |
| ptn__sec__residual__abs__gt0__flag[ k ] | ae(v) |
| if( ptn__sec__residual__abs__gt0__flag[ k ] ) { | |
| ptn__sec__residual__abs__gt1__flag[ k ] | ae(v) |
| if( ptn__sec__residual__abs__gt1__flag[ k ] ) | |
| ptn__sec__residual__abs__minus2[ k ] | ae(v) |
| ptn__sec__residual__sign__flag[ k ] | ae(v) |
| } | |
| } | |
| <ADD> PtnNodeCnt++ </ADD> | |
| for( i = 0; i < ptn__child__cnt[ nodeIdx ]; i++) | |
| geometry__predtree__node( depth + 1, ++PtnNodeIdx ) | |
| } | |

<ADD> When (PtnNodeCnt % ptn_group_size==0) is not true, ptn_inter_flag[ ] and ptn_inter_pred_mode[ ] are not signalled and inferred to be equal to the ptn_inter_flag[ ] and ptn_inter_pred_mode[ ] of the preceding point in decoding order. </ADD>

In some cases, the size of GoPt may be signalled for each tree separately. The signalling may be as follows:

| | Descriptor |
|---|---|
| geometry__predtree__data( ) { | |
| PtnNodeIdx = 0 | |
| do { | |
| <ADD> PtnNodeCnt = 0 | |
| ptn__group__size | ue(v) |
| | </ADD> |
| geometry__predtree__node(0, PtnNodeIdx ) | |

-continued

| | Descriptor |
|---|---|
| gpt__end__of__trees__flag | ae(v) |
| } while( !gpt__end__of__trees__flag ) | |
| } | |

In some cases, the size of GoPt may be signalled for each tree separately. The signalling may be as follows:

| | Descriptor |
|---|---|
| geometry__predtree__data( ) { | |
| PtnNodeIdx = 0 | |
| do { | |
| <ADD> NumPtsRemInGp = 0 </ADD> | |
| geometry__predtree__node(0, PtnNodeIdx ) | |
| gpt__end__of__trees__flag | ae(v) |
| } while( !gpt__end__of__trees__flag ) | |
| } | |

| | Descriptor |
|---|---|
| geometry__predtree__node( depth, nodeIdx ) { | |
| <ADD> if (NumPtsRemInGp == 0) | |
| ptn__group__size__minus1 | ue(v) </ADD> |
| if( geom__scaling__enabled__flag && !( nodeIdx % PtnQpInterval ) ) { | |
| ptn__qp__offset__abs__gt0__flag | ae(v) |
| if( ptn__qp__offset__abs__gt0__flag ) { | |
| ptn__qp__offset__abs__minus1 | ae(v) |
| ptn__qp__offset__sign__flag | ae(v) |
| } | |
| } | |
| if( duplicate__points__enabled__flag ) { | |
| ptn__point__cnt__gt1__flag [Ed, dup points?] | ae(v) |
| if( ptn__point__cnt__gt1__flag ) | |
| ptn__point__cnt__minus2 | ae(v) |
| } | |
| ptn__child__cnt[ nodeIdx ] | ae(v) |
| if(InterEnableFlag && <ADD> (NumPtsRemInGp == 0) </ADD> ) { | |
| ptn__inter__flag[ nodeIdx ] | u(1) |
| if (ptn__inter__flag[ nodeIdx ] ) | |
| ptn__inter__pred__mode[ nodeIdx ] | u(1) |
| } | |
| if( !ptn__inter__flag[ nodeidx ] ) | |
| ptn__pred__mode[ nodeIdx ] | ae(v) |
| if( geometry__angular__enabled__flag ) { | |
| ptn__phi__mult__abs__gt0__flag | ae(v) |
| if( ptn__phi__mult__abs__gt0__flag ) { | |
| ptn__phi__mult__abs__gt1__flag | ae(v) |

-continued

| | Descriptor |
|---|---|
| if( ptn_phi_mult_abs_gt1_flag ) | |
| ptn_phi_mult_abs_minus2 | ae(v) |
| if( ptn_phi_mult_abs_minus2 = = 7 ) | |
| ptn_phi_mult_abs_minus9 | ae(v) |
| ptn_phi_mult_sign_flag | ae(v) |
| } | |
| } | |
| numComp = geometry_angular_enabled_flag && !number_lasers_minus1 ? 2 : 3 | |
| for( k = 0; k < numComp; k++ ) { | |
| ptn_residual_abs_gt0_flag[ k ] | ae(v) |
| if( ptn_residual_abs_gt0_flag[ k ] ) { | |
| ptn_residual_abs_log2[ k ] | ae(v) |
| ptn_residual_abs_remaining[ k ] | ae(v) |
| if( k \|\| ptn_pred_mode[ nodeIdx ] \|\| ptn_inter_flag[ nodeIdx ] ) | |
| ptn_residual_sign_flag[ k ] | ae(v) |
| } | |
| } | |
| if( geometry_angular_enabled_flag ) | |
| for( k = 0; k < 3; k++ ) { | |
| ptn_sec_residual_abs_gt0_flag[ k ] | ae(v) |
| if( ptn_sec_residual_abs_gt0_flag[ k ] ) { | |
| ptn_sec_residual_abs_gt1_flag[ k ] | ae(v) |
| if( ptn_sec_residual_abs_gt1_flag[ k ] ) | |
| ptn_sec_residual_abs_minus2[ k ] | ae(v) |
| ptn_sec_residual_sign_flag[ k ] | ae(v) |
| } | |
| } | |
| <ADD> if( NumPtsRemInGp == 0) | |
| NumPtsRemInGp = PtnGroupSize | |
| NumPtsRemInGp-- </ADD> | |
| for( i = 0; i < ptn_child_cnt[ nodeIdx ]; i++) | |
| geometry_predtree_node( depth + 1, ++PtnNodeIdx ) | |
| } | |

The value of ptn_group_size may be constrained to be less than a particular threshold (e.g., 32).

In some cases, only the ptn_inter_flag[ ] syntax element may be shared by all the points in the GoPt. In such cases, ptn_inter_pred_mode may be signalled separately for each inter predicted point. The syntax in this case may be as follows:

| | |
|---|---|
| ... | |
| if(InterEnableFlag && <ADD> (PtnNodeCnt % ptn_group_size == 0) </ADD>) { | |
| ptn_inter_flag[ nodeIdx ] | u(1) |
| if (ptn_inter_flag[ nodeIdx ] ) | |
| ptn_inter_pred_mode[ nodeIdx ] | u(1) |
| } | |
| ... | |
| ... | |

In one case, ptn_group_size_minus1 may be coded using arithmetic coding.

In a second example, the inter prediction flag and the inter prediction mode may be shared by all the points in a GoPt. The start of a GoPt may be signalled in the bitstream with a flag.

Additions with respect to the GPCC (Ed.1) syntax and semantics for the second example are shown with <ADD> . . . </ADD> tags, and removals are shown with <DELETE> . . . </DELETE> tags.

| | Descriptor |
|---|---|
| geometry_predtree_node( depth, nodeIdx ) { | |
| <ADD> gopt_start_flag | u(1) </ADD> |
| if( geom_scaling_enabled_flag && !( nodeIdx % PtnQpInterval ) ) { | |
| ptn_qp_offset_abs_gt0_flag | ae(v) |
| if( ptn_qp_offset_abs_gt0_flag ) { | |
| ptn_qp_offset_abs_minus1 | ae(v) |

-continued

| | Descriptor |
|---|---|
| ptn_qp_offset_sign_flag | ae(v) |
| } | |
| } | |
| if( duplicate_points_enabled_flag ) { | |
| ptn_point_cnt_gt1_flag [Ed, dup points?] | ae(v) |
| if( ptn_point_cnt_gt1_flag ) | |
| ptn_point_cnt_minus2 | ae(v) |
| } | |
| ptn_child_cnt[ nodeIdx ] | ae(v) |
| if(InterEnableFlag && <ADD>gopt_start_flag</ADD> ) { | |
| ptn_inter_flag[ nodeIdx ] | u(1) |
| if (ptn_inter_flag[ nodeIdx ] ) | |
| ptn_inter_pred_mode[ nodeIdx ] | u(1) |
| } | |
| if( !ptn_inter_flag[ nodeidx ] ) | |
| ptn_pred_mode[ nodeIdx ] | ae(v) |
| if( geometry_angular_enabled_flag ) { | |
| ptn_phi_mult_abs_gt0_flag | ae(v) |
| if( ptn_phi_mult_abs_gt0_flag ) { | |
| ptn_phi_mult_abs_gt1_flag | ae(v) |
| if( ptn_phi_mult_abs_gt1_flag ) | |
| ptn_phi_mult_abs_minus2 | ae(v) |
| if( ptn_phi_mult_abs_minus2 = = 7 ) | |
| ptn_phi_mult_abs_minus9 | ae(v) |
| ptn_phi_mult_sign_flag | ae(v) |
| } | |
| } | |
| numComp = geometry_angular_enabled_flag && !number_lasers_minus1 ? 2 : 3 | |
| for( k = 0; k < numComp; k++ ) { | |
| ptn_residual_abs_gt0_flag[ k ] | ae(v) |
| if( ptn_residual_abs_gt0_flag[ k ] ) { | |
| ptn_residual_abs_log2[ k ] | ae(v) |
| ptn_residual_abs_remaining[ k ] | ae(v) |
| if( k \|\| ptn_pred_mode[ nodeIdx ] \|\| ptn_inter_flag[ nodeIdx ] ) | |
| ptn_residual_sign_flag[ k ] | ae(v) |
| } | |
| } | |
| if( geometry_angular_enabled_flag ) | |
| for( k = 0; k < 3; k++ ) { | |
| ptn_sec_residual_abs_gt0_flag[ k ] | ae(v) |
| if( ptn_sec_residual_abs_gt0_flag[ k ] ) { | |
| ptn_sec_residual_abs_gt1_flag[ k ] | ae(v) |
| if( ptn_sec_residual_abs_gt1_flag[ k ] ) | |
| ptn_sec_residual_abs_minus2[ k ] | ae(v) |
| ptn_sec_residual_sign_flag[ k ] | ae(v) |
| } | |
| } | |
| for( i = 0; i < ptn_child_cnt[ nodeIdx ]; i++) | |
| geometry_predtree_node( depth + 1, ++PtnNodeIdx ) | |
| } | |

<ADD>gopt_start_flag equal to 1 specifies that the current point starts a new GoPt. gopt_start_flag equal to 0 specifies that the current point does not start a new GoPt. When gopt_start_flag is equal to 0, ptn_inter_flag[ ] and ptn_inter_pred_mode[ ] are not signalled and inferred to be equal to the ptn_inter_flag[ ] and ptn_inter_pred_mode[ ] of the preceding point in decoding order. </ADD>

The gopt_start_flag syntax element may be an example of a syntax element having a value that indicates whether a current point starts a new group of points. In some examples, gopt_start_flag may be coded using arithmetic coding.

Figure 10:
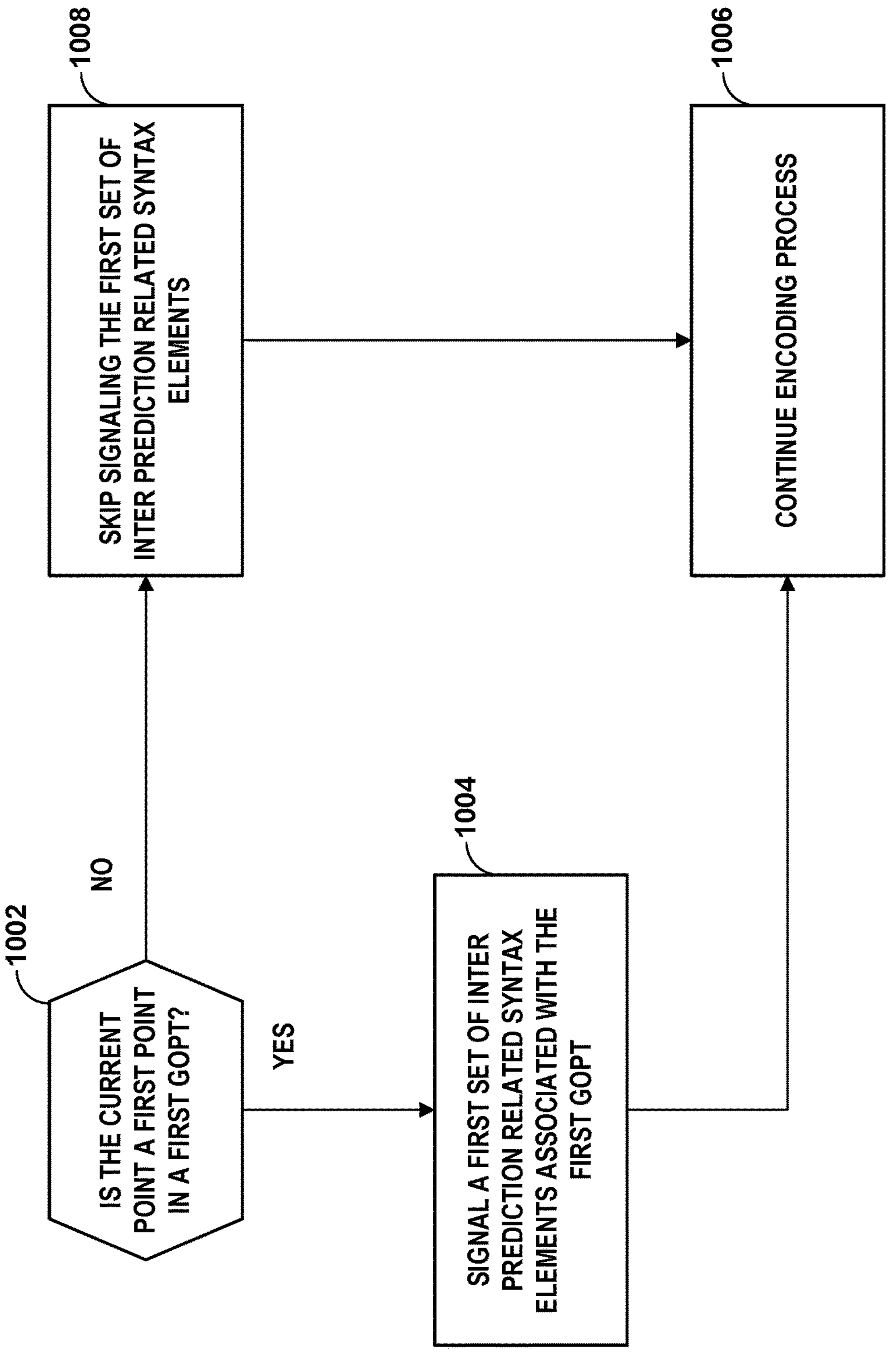
FIG. 10 is a flow diagram illustrating an example encoding process, in accordance with one or more techniques of this disclosure.

FIG. 10 is a flow diagram illustrating an example encoding technique, in accordance with one or more techniques of this disclosure. The technique of FIG. 10 may be performed by a G-PCC encoder, such as G-PCC encoder 200 of FIGS. 1 and 2.

G-PCC encoder 200 may determine whether a current point is a first point in a first group of points GoPt (1002). For instance, the G=PCC encoder 200 may determine that the current point is the first point in the first group of points where coding the current and subsequent points as a group would yield improved coding efficiency.

Responsive to determining that the current point is the first point in the first group of points ("Yes" branch of 1002), G-PCC encoder 200 may signal a first set of inter prediction related syntax elements associated with the first group of points. For instance, the G-PCC encoder 200 may signal one or both of a inter prediction flag (e.g., ptn_inter_flag) and an inter prediction mode syntax element (e.g., ptn_inter_pred_mode), the values of which are to be applied to all points in the first set of points.

The G-PCC encoder 200 may continue with the encoding process (1006). For instance, the G-PCC encoder 200 may evaluate a next point and determine that the next point is not the first point in the first group of points ("No" branch of 1002). For instance, the subsequent point may be a second or subsequent point included in the first group of points. Responsive to determining that the next point is not the first point in the first group of points ("No" branch of 1002), the G-PCC encoder 200 may skip signaling the first set of inter prediction related syntax elements (1008). For instance, as G-PCC encoder 200 already signaled the first set of inter prediction related syntax elements for the first point in the first group of points, the G-PCC encoder 200 may refrain from re-signalling the same first set of inter prediction related syntax elements for the second and subsequent points in the first group of points.

Figure 11:
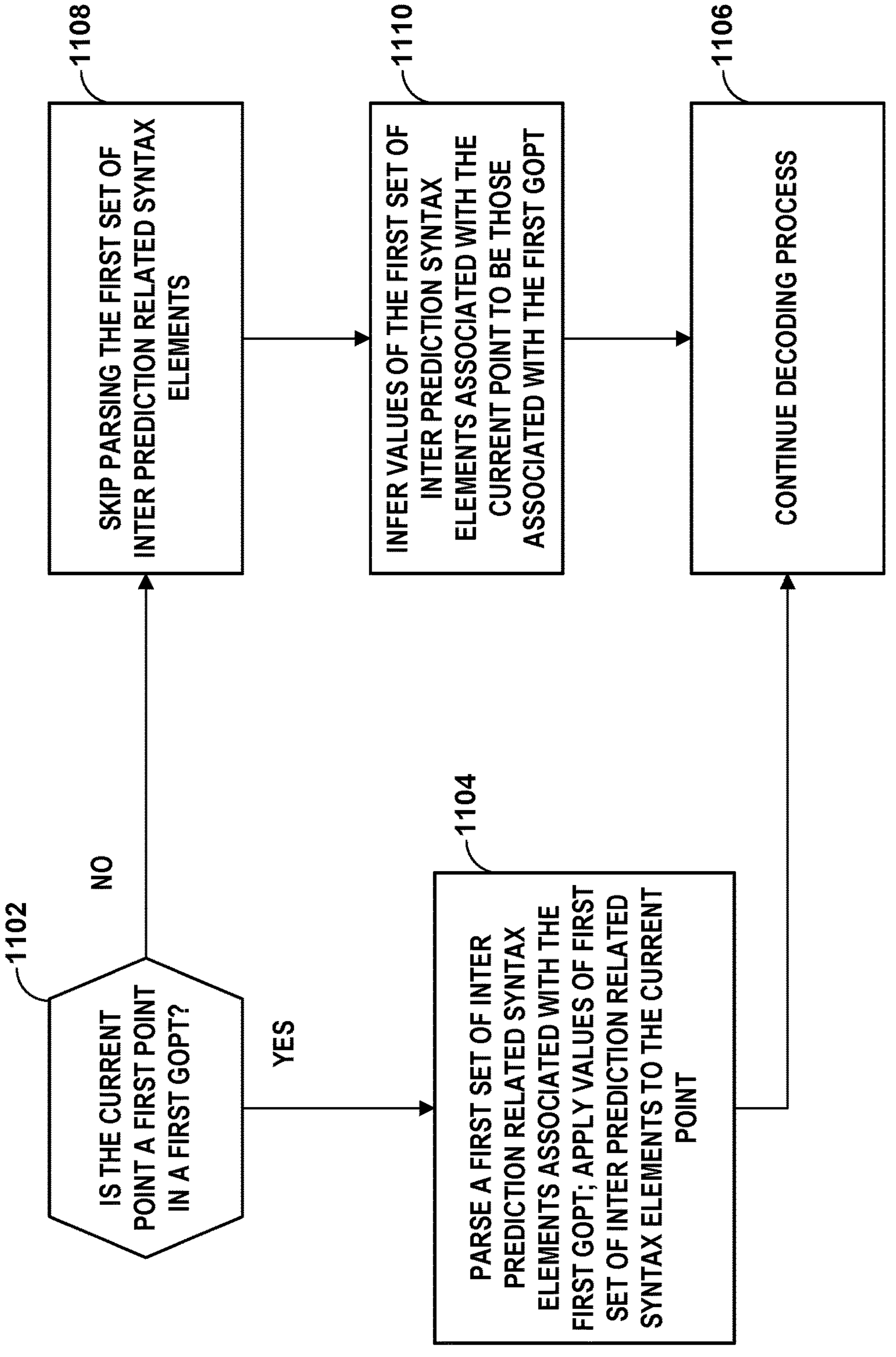
FIG. 11 is a flow diagram illustrating an example encoding process, in accordance with one or more techniques of this disclosure.

FIG. 11 is a flow diagram illustrating an example encoding technique, in accordance with one or more techniques of this disclosure. The technique of FIG. 11 may be performed by a G-PCC decoder, such as G-PCC decoder 300 of FIGS. 1 and 3.

G-PCC decoder 300 may determine whether a current point is a first point in a first group of points GoPt (1102). For instance, the G-PCC decoder 300 may determine whether a node count of the current point (PtnNodeCnt) indicates that the current point is the first point in the first group of points. In some examples, the G-PCC decoder 300 may determine that the current point is the first point in the first group of points where a remainder of dividing the node count of the current point by a number of points in the first group of points (ptn_group_size) is zero (e.g., where PtnNodeCnt % ptn_group_size==0 is true). Similarly, the G-PCC decoder 300 may determine that the current point is not the first point in the first group of points where the remainder of dividing the node count of the current point by a number of points in the first group of points (ptn_group_size) is not zero (e.g., where PtnNodeCnt % ptn_group_size==0 is not true).

Responsive to determining that the current point is the first point in the first group of points ("Yes" branch of 1102), G-PCC decoder 300 parse decode a first set of inter prediction related syntax elements associated with the first group of points. For instance, the G-PCC decoder 300 may parse one or both of a inter prediction flag (e.g., ptn_inter_flag) and an inter prediction mode syntax element (e.g., ptn_inter_pred_mode). In some examples, the first point in a group of points may be referred to as an initial point in the group of points.

The G-PCC decoder 300 may continue with the decoding process (1106). For instance, the G-PCC decoder 300 may evaluate a next point (1102) and determine that the next point is not the first point in the first group of points ("No" branch of 1102). For instance, the subsequent point may be a second or subsequent point included in the first group of points. Responsive to determining that the next point is not the first point in the first group of points ("No" branch of 1102), the G-PCC decoder 300 may skip parsing the first set of inter prediction related syntax elements (110). For instance, as G-PCC encoder 200 already signaled the first set of inter prediction related syntax elements for the first point in the first group of points, the G-PCC decoder 300 may refrain from re-signalling the same first set of inter prediction related syntax elements for the second and subsequent points in the first group of points. Instead, the G-PCC decoder 300 may infer values of the first set of inter prediction syntax elements associated with the next point to be those associated with the first group of points (1110) (e.g., those parsed at 1104).

The G-PCC decoder 300 may predict points of the first group of points based on the first set of inter prediction related syntax elements parsed for the first point. For instance, where the first set of inter prediction related syntax elements parsed for the first point includes an inter prediction flag specifying that inter prediction is used, G-PCC decoder 300 may predict all points (including the first point and the so called "next point") using inter prediction. In this way, the G-PCC decoder 300 may predict the next point (e.g., a second point) based on the first set of inter prediction related syntax elements parsed for the first point.

As noted above, the determination that the current point is the first point in a group of points (GoPt) may be based on the number of points in the GoPt or an indication (such as gopt_start_flag). When the number of points in a GoPt is used as a determining factor, an additional counter may be used to count the number of points coded; this counter is updated when each point is coded. The determination may also be based on the beginning of coding a new GoPt has begun.

The first set of inter prediction syntax elements may include one or more of inter prediction flag, inter prediction mode, etc. As described above, the first set may also include syntax elements that are not associated with inter prediction (such as intra prediction-related syntax elements, residual syntax elements, etc.). The values used for the first set of inter prediction syntax elements for a GoPt may be obtained by a rate-distortion optimization by computing the RD cost over all the points in the GoPt. E.g., the cost associated with encoding all the points in the GoPt as inter is compared with cost associated with encoding all the points in the GoPt as intra; the coding type (inter/intra) with the lower cost is selected and the inter prediction flag value is thus determined. In some examples, the inter prediction mode may also be selected similarly, or one or more syntax elements may be jointly selected based on the cost associated with each value combination of the syntax elements. E.g., cost associated with coding the points in the GoPt for one or more values combination of inter prediction flag and inter prediction mode may be tested and, the value combination that results in the lowest cost may be selected as the value combination (of inter prediction flag and inter prediction mode) to be coded for the GoPt.

It must be understood that there may be other steps in between the steps described above in the flowcharts of FIGS. 10 and 11 which correspond to the coding of predictive geometry syntax elements.

Note that the signalling of the first set of inter prediction syntax elements may not necessarily be with the first point in the GoPt, but could be in other locations in the bitstream. E.g., it may be with the last point in the GoPt, before the beginning of the GoPt, after the end of the GoPt, or the first set of syntax elements associated with one or more GoPt may be signalled together in another location (e.g., end of slice header, end of prediction tree signalling, etc.).

Examples in the various aspects of this disclosure may be used individually or in any combination.

The following numbered clauses may illustrate the above disclosure:

Clause 1A. A method of decoding a point cloud, the method comprising: responsive to determining that a first point of the point cloud is a first point in a first group of points of one or more groups of points of the point cloud: parsing, from a bitstream, one or more syntax elements related to inter prediction for the first group of points; and predicting, based on the one or more syntax elements, the first point.

Clause 2A. The method of clause 1A, further comprising: responsive to determining that a second point of the point cloud is included in the first group of points but is not the first point in the first group of points: predicting, based on the one or more syntax elements, the second point.

Clause 3A. The method of clause 2A, wherein predicting, based on the one or more syntax elements, the second point does not include re-parsing, from the bitstream, syntax elements included in the one or more syntax elements related to inter prediction for the first group of points.

Clause 4A. The method of clause 1A, further comprising: responsive to determining that a third point of the point cloud is a first point in a second group of points of the one or more groups of points: parsing, from the bitstream, one or more syntax elements related to inter prediction for the second group of points; and predicting, based on the one or more syntax elements related to inter prediction for the second group of points, the third point.

Clause 5A. The method of clause 4A, further comprising: responsive to determining that a fourth point of the point cloud is included in the second group of points but is not the first point in the second group of points: predicting, based on the one or more syntax elements related to inter prediction for the second group of points, the fourth point.

Clause 6A. The method of clause 1A, further comprising: parsing, from the bitstream, a syntax element having a value that represents a quantity of points included in each group of points of the one or more groups of points.

Clause 7A. The method of clause 6A, wherein the syntax element having the value that represents the quantity of points included in each group of points of the one or more groups of points comprises a ptn_group_size_minus1 syntax element.

Clause 8A. The method of clause 1A, further comprising: parsing, from the bitstream, a syntax element having a value that indicates whether the first point is the first point in the first group of points.

Clause 9A. The method of clause 8A, wherein the syntax element having the value that indicates whether the first point is the first point in the first group of points comprises a gopt_start_flag syntax element.

Clause 1B. A method of encoding a point cloud, the method comprising: responsive to determining that a first point of the point cloud is a first point in a first group of points of one or more groups of points of the point cloud: encoding, in a bitstream, one or more syntax elements related to inter prediction for the first group of points.

Clause 2B. The method of clause 1B, further comprising: responsive to determining that a second point of the point cloud is included in the first group of points but is not the first point in the first group of points: skip re-encoding, for the second point, the one or more syntax elements related to inter prediction for the first group of points.

Clause 3B. The method of clause 1B, further comprising: responsive to determining that a third point of the point cloud is a first point in a second group of points of the one or more groups of points: encoding, in the bitstream, one or more syntax elements related to inter prediction for the second group of points.

Clause 4B. The method of clause 3B, further comprising: responsive to determining that a fourth point of the point cloud is included in the second group of points but is not the first point in the second group of points: skip re-encoding, for the fourth point, the one or more syntax elements related to inter prediction for the second group of points.

Clause 5B. The method of clause 1B, further comprising: encoding, in the bitstream, a syntax element having a value that represents a quantity of points included in each group of points of the one or more groups of points.

Clause 6B. The method of clause 5B, wherein the syntax element having the value that represents the quantity of points included in each group of points of the one or more groups of points comprises a ptn_group_size_minus1 syntax element.

Clause 7B. The method of clause 1B, further comprising: encoding, in the bitstream, a syntax element having a value that indicates whether the first point is the first point in the first group of points.

Clause 8B. The method of clause7B, wherein the syntax element having the value that indicates whether the first point is the first point in the first group of points comprises a gopt_start_flag syntax element.

Clause 9B. The method of clause 1B, further comprising generating the point cloud.

Clause 1Z. A device for processing a point cloud, the device comprising one or more means for performing the method of any of clauses 1A-9B.

Clause 2Z. The device of clause 1Z, wherein the one or more means comprise one or more processors implemented in circuitry.

Clause 3Z. The device of any of clauses 1Z or 2Z, further comprising a memory to store the data representing the point cloud.

Clause 4Z. The device of any of clauses 1Z-3Z, wherein the device comprises a decoder.

Clause 5Z. The device of any of clauses 1Z-4Z, wherein the device comprises an encoder.

Clause 6Z. The device of any of clauses 1Z-5Z, further comprising a device to generate the point cloud.

Clause 7Z. The device of any of clauses 1Z-6Z, further comprising a display to present imagery based on the point cloud.

Clause 8Z. A computer-readable storage medium having stored thereon instructions that, when executed, cause one or more processors to perform the method of any of clauses 1A-9B.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding a point cloud, the method comprising:

responsive to determining, by an encoder device, that a first point of the point cloud is a first point in a first group of points of one or more groups of points of the point cloud, encoding, by the encoder device and in a bitstream, one or more syntax elements for the first group of points;

responsive to determining that a second point of the point cloud is included in the first group of points but is not the first point in the first group of points, refrain from encoding, by the encoder device and for the second point, the one or more syntax elements for the first group of points;

responsive to determining that a third point of the point cloud is a first point in a second group of points of the one or more groups of points, encoding by the encoder device, in the bitstream, one or more syntax elements for the second group of points; and responsive to determining that a fourth point of the point cloud is included in the second group of points but is not the first point in the second group of points, refrain from encoding, by the encoder device and for the fourth point, the one or more syntax elements for the second group of points; and encoding, by the encoder device and in the bitstream, a syntax element having a value that represents a quantity of points included in each group of points of the one or more groups of points.

2. The method of claim 1, wherein the syntax element having the value that represents the quantity of points included in each group of points of the one or more groups of points comprises a ptn_group_size_minus1 syntax element.

3. The method of claim 1, further comprising:

encoding, by the encoder device and in the bitstream, a syntax element having a value that indicates whether the first point is the first point in the first group of points.

4. The method of claim 3, wherein the syntax element having the value that indicates whether the first point is the first point in the first group of points comprises a gopt_start_flag syntax element.

5. The method of claim 1, wherein the one or more syntax elements comprise one or more syntax elements related to inter prediction for the first group of points, and wherein the one or more syntax elements related to inter prediction for the first group of points comprise one or both of an inter prediction flag and an inter prediction mode syntax element.

6. A method of decoding a point cloud, the method comprising:

responsive to determining that a first point of the point cloud is a first point in a decoding order in a first group of points of a plurality of groups of points of the point cloud, the first group of points comprising a plurality of points that are consecutive in the decoding order:

parsing, by a decoder device and from a bitstream, one or more syntax elements related to inter prediction for the first group of points;

responsive to determining that a subsequent point of the point cloud in the decoding order is in the first group of points of the plurality of groups of points of the point cloud but is not the first point in the decoding order:

skipping, by the decoder device, coding the one or more syntax elements related to inter prediction for the subsequent point;

predicting, by the decoder device and based on the one or more syntax elements related to inter prediction for the first group of points, each point in the first group of points, wherein the one or more syntax elements related to inter prediction for the first group of points are applicable to all of the points in the first group of points;

determining, based on a comparison of a node count of the first point and a quantity of points included in the first group of points, whether the first point of the point cloud is the first point in the first group of points; and parsing, by the decoder device and from the bitstream, a syntax element having a value that represents a quantity of points included in each group of points of the plurality of groups of points, wherein the quantity of points included in the first group of points is the quantity of points included in each group of points of the one or more groups of points.

7. The method of claim 6, further comprising:

responsive to determining that a second point of the point cloud is a first point in the decoding order in a second group of points of the plurality of groups of points:

parsing, by the decoder device and from the bitstream, one or more syntax elements related to inter prediction for the second group of points without parsing the one or more syntax elements related to inter prediction for each subsequent point of the second group of points; and predicting, by the decoder device and based on the one or more syntax elements related to inter prediction for the second group of points, the second point, wherein the one or more syntax elements related to inter prediction for the second group of points are applicable to all of the points in the second group of points.

8. The method of claim 6, wherein determining whether the first point of the point cloud is the first point in the first group of points comprises:

determining, by the decoder device, that the first point of the point cloud is the first point in the first group of points where a remainder of dividing the node count of the first point by the quantity of points in the first group of points is equal to zero.

9. The method of claim 6, wherein the syntax element having the value that represents the quantity of points included in each group of points of the plurality of of points comprises a ptn_group_size_minus1 syntax element.

10. The method of claim 6, further comprising:

parsing, by the decoder device and from the bitstream, a syntax element having a value that indicates whether the first point is the first point in the first group of points.

11. The method of claim 10, wherein the syntax element having the value that indicates whether the first point is the first point in the first group of points comprises a gopt_start_flag syntax element.

12. The method of claim 6, wherein the one or more syntax elements related to inter prediction for the first group of points comprise one or both of an inter prediction flag and an inter prediction mode syntax element.

13. A device for processing a point cloud, the device comprising:

a memory configured to store at least a portion of the point cloud; and one or more processors implemented in circuitry and configured to:

determine whether a first point of the point cloud is a first point in a first group of points of one or more groups of points of the point cloud; and responsive to determining that the first point of the point cloud is the first point in the first group of points, encode, in a bitstream, one or more syntax elements related to inter prediction for the first group of points;

determine whether a second point of the point cloud is included in the first group of points but is not the first point in the first group of points; and responsive to determining that the second point of the point cloud is included in the first group of points but is not the first point in the first group of points, not encode, for the second point, the one or more syntax elements related to inter prediction for the first group of points; and encode, in the bitstream, a syntax element having a value that represents a quantity of points included in each group of points of the one or more groups of points.

14. The device of claim 13, wherein the one or more syntax elements related to inter prediction for the first group of points comprise one or both of an inter prediction flag and an inter prediction mode syntax element.

15. A device for processing a point cloud, the device comprising:

a memory configured to store at least a portion of the point cloud; and one or more processors implemented in circuitry and configured to:

determine whether a first point of the point cloud is a first point in a decoding order in a first group of points of a plurality of groups of points of the point cloud, the first group of points comprising a plurality of points that are consecutive in the decoding order;

responsive to determining that the first point of the point cloud is the first point in the first group of points:

parse, from a bitstream, one or more syntax elements related to inter prediction for the first group of points;

responsive to determining that a subsequent point of the point cloud in the decoding order is in the first group of points of the plurality of groups of points of the point cloud but is not the first point in the decoding order:

skip parsing the one or more syntax elements related to inter prediction for the subsequent point of the first group of points;

predict, based on the one or more syntax elements related to inter prediction for the first group of points, each point in the first group of points, wherein the one or more syntax elements related to inter prediction for the first group of points are applicable to all of the points in the first group of points, wherein to determine whether the first point of the point cloud is the first point in the first group of points the one or more processors are configured to determine, based on a comparison of a node count of the first point and a quantity of points included in the first group of points, whether the first point of the point cloud is the first point in the first group of points; and parse, from the bitstream, a syntax element having a value that represents a quantity of points included in each group of points of the one or more groups of points, wherein the quantity of points included in the first group of points is the quantity of points included in each group of points of the one or more groups of points.

16. The device of claim 15, wherein, to determine whether the first point of the point cloud is the first point in the first group of points, the one or more processors are configured to:

determine that the first point of the point cloud is the first point in the first group of points where a remainder of dividing the node count of the first point by the quantity of points in the first group of points is equal to zero.

17. The device of claim 15, wherein the one or more syntax elements related to inter prediction for the first group of points comprise one or both of an inter prediction flag and an inter prediction mode syntax element.

* * * * *